US011413759B2

(12) United States Patent
Shino

(10) Patent No.: US 11,413,759 B2
(45) Date of Patent: Aug. 16, 2022

(54) ROBOT APPARATUS, CONTROL METHOD FOR CONTROLLING THE SAME, NON-TRANSITORY COMPUTER-READABLE RECORDING MEDIUM, MANUFACTURING SYSTEM, AND METHOD FOR MANUFACTURING AN ARTICLE

(71) Applicant: CANON KABUSHIKI KAISHA, Tokyo (JP)

(72) Inventor: Kenji Shino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 447 days.

(21) Appl. No.: 16/181,823

(22) Filed: Nov. 6, 2018

(65) Prior Publication Data
US 2019/0168389 A1    Jun. 6, 2019

(30) Foreign Application Priority Data

Dec. 1, 2017 (JP) .............................. JP2017-232096

(51) Int. Cl.
  *B25J 9/16* (2006.01)
  *B25J 13/08* (2006.01)
  (Continued)

(52) U.S. Cl.
  CPC ........... *B25J 9/1694* (2013.01); *B25J 9/0009* (2013.01); *B25J 13/088* (2013.01); *B25J 17/02* (2013.01); *B25J 18/00* (2013.01)

(58) Field of Classification Search
  CPC ...... B25J 9/0009; B25J 13/088; B25J 9/1674; B25J 17/02; B25J 9/1694; B25J 18/00
  See application file for complete search history.

(56) References Cited

U.S. PATENT DOCUMENTS

| 4,163,183 A | * | 7/1979 | Engelberger | .............. F16H 9/10 318/568.18 |
| 4,327,437 A | * | 4/1982 | Gelderloos | ........ G11B 3/08516 244/194 |

(Continued)

FOREIGN PATENT DOCUMENTS

| JP | 2010-008591 A | 1/2010 |
| JP | 2011-123716 A | 6/2011 |

(Continued)

OTHER PUBLICATIONS

Sep. 7, 2021 Japanese Official Action in Japanese Patent Appln. No. 2017-232096.

(Continued)

*Primary Examiner* — Stephen Holwerda
(74) *Attorney, Agent, or Firm* — Venable LLP

(57) ABSTRACT

A robot arm includes a joint and links connected via the joint, a first encoder configured to detect information related to a position of the joint, a second encoder configured to detect information related to the position of the joint independently from the first encoder, and a controller configured to control an operation of the joint. The second encoder includes a scale in which a pattern is formed and a detector configured to detect position information of the joint by reading the pattern of the scale. The controller is configured to, in a case where a reading error occurs in the detector of the second encoder, execute encoder redetection processing of driving the joint of the robot arm on a basis of the detection result of the first encoder and redetecting the position information by the second encoder.

20 Claims, 17 Drawing Sheets

(51) Int. Cl.
   *B25J 18/00*    (2006.01)
   *B25J 17/02*    (2006.01)
   *B25J 9/00*     (2006.01)

(56) References Cited

U.S. PATENT DOCUMENTS

| | | | |
|---|---|---|---|
| 2004/0073336 A1* | 4/2004 | Huang | B25J 9/1674 |
| | | | 318/568.11 |
| 2009/0259340 A1* | 10/2009 | Umemoto | G05B 19/4062 |
| | | | 700/275 |
| 2014/0201571 A1* | 7/2014 | Hosek | G05B 23/0221 |
| | | | 714/26 |
| 2015/0165620 A1 | 6/2015 | Osaka | |
| 2015/0276436 A1* | 10/2015 | Hasebe | B25J 13/088 |
| | | | 310/68 B |
| 2015/0360369 A1* | 12/2015 | Ishikawa | B25J 9/1674 |
| | | | 901/23 |
| 2016/0199982 A1 | 7/2016 | Harada et al. | |

FOREIGN PATENT DOCUMENTS

| | | | |
|---|---|---|---|
| JP | 2015-090300 A | 5/2015 |
| JP | 2015-131385 A | 7/2015 |
| JP | 2016-124094 A | 7/2016 |

OTHER PUBLICATIONS

Apr. 5, 2022 Office Action in Japanese Patent Application No. 2017-232096.

* cited by examiner

ROBOT APPARATUS, CONTROL METHOD FOR CONTROLLING THE SAME, NON-TRANSITORY COMPUTER-READABLE RECORDING MEDIUM, MANUFACTURING SYSTEM, AND METHOD FOR MANUFACTURING AN ARTICLE

BACKGROUND OF THE INVENTION

Field of the Invention

The present invention relates to an industrial robot apparatus, a controlling method for controlling the robot apparatus, a non-transitory computer-readable recording medium storing a control program for the robot apparatus, a manufacturing system including the robot apparatus, and a method for manufacturing an article using the robot apparatus.

Description of the Related Art

In a manufacturing line for manufacturing a product or a part, a robot apparatus including an articulated robot arm is sometimes used as a manufacturing apparatus. A robot arm of this kind manipulates a workpiece by, for example, a tool such as a finger and a hand serving as a gripping apparatus or another tool, and thus manufactures an article such as an industrial product or a part thereof.

A body of the robot arm of this kind includes a joint connecting links. The mechanism of this joint includes, for example, a servo motor such as an alternate current servo motor: AC servo motor or a direct current brushless servo motor: DC brushless servo motor, and a reduction gear provided on the output side thereof, and thus controls relative positions, that is, angles of the two links. This reduction gear is disposed to obtain a high-output driving torque and convert a rotation speed, that is, the number of rotations between the links and the servo motor.

A robot control apparatus performs position control of operating aiming for a control target obtained by inverse-kinematic calculation for controlling the position and orientation of a standard portion of the robot arm, for example, a tool center point: TCP at the distal end of the arm. The control target in the position control can be either of the position and angle of the joint. In the description below, it is assumed that "position of the joint" or "position information of the joint" can refer to a coordinate of the joint and an angle of the joint. In the position control of the robot arm, an encoder disposed on the input side or the output side of the reduction gear that drives the joint is widely used. Examples of this kind of encoder include an encoder directly connected to the input side of the reduction gear, for example, to a rotation shaft of a motor of a drive source. This encoder will be hereinafter referred to as an input shaft encoder.

In the control using the input shaft encoder, twisting and backlash of the reduction gear coupled to the motor is not detected, and thus a position error of the distal end of the robot arm occurs. In addition, the driving system sometimes includes a timing belt between the motor and the reduction gear, and the position error at the distal end of the robot arm sometimes occurs due to twisting and backlash derived from the timing belt. The driving system will be also referred to as a gearing system or a transmission system. In addition, the position error at the distal end of the robot arm also occurs as a result of change in the orientation of the robot arm or in the mass of the workpiece.

A control error of a distal end position of the robot arm can be reduced by detecting, for example, a value corresponding to the actual angle of the joint by an encoder disposed on the output side of the reduction gear and performing robot control on the basis of the value. The encoder disposed on the output side of the reduction gear will be hereinafter referred to as an output shaft encoder.

In addition, a configuration in which an encoder is disposed on each of the input side and the output side of the reduction gear is known. For example, this configuration is disclosed in Japanese Patent No. 5972346. Further, as the configuration in which an encoder is disposed on, for example, each of the input side and the output side of the reduction gear, a configuration in which position detection is performed by combining output of the two encoders is known. For example, this configuration is disclosed in Japanese Patent No. 5980965. In the configuration of Japanese Patent No. 5980965, in the case where position information cannot be obtained from one of the encoders, absolute position information of one of the encoders is calculated by using position information of the other of the encoders.

A rotary encoder used for the joint of the robot arm includes a scale in which a pattern is formed and a detection head including, for example, an optical sensor that detects a position by reading the pattern of the scale, and obtains position information by detecting relative movement of the two. Examples of this kind of encoder device can be roughly divided into products called absolute encoders and incremental encoders. Some absolute encoders are configured as, for example, devices each capable of reading an absolute coordinate from a signal read from a scale including a plurality of tracks by a detection head with phase difference. In addition, some incremental encoders are configured as devices that each output a pulse signal that can be converted into a relative coordinate while a detection head and a scale thereof are relatively moving.

In either of the absolute and incremental encoder systems, when a scratch is formed on or foreign matter attaches to the scale of the encoder, sometimes the reading result of the detection head becomes disturbed, the position information cannot be accurately read, and thus a reading error occurs. Some encoder devices are configured to generate an error signal when detecting such a reading error.

In a so-called industrial robot arm that is disposed in a manufacturing line in a factory, if the robot arm is forced to emergency stop due to the reading error of the encoder described above, manufacture of the parts or industrial products will be also stopped during the stop. In the case where the robot is stopped, a restoration operation of removing the foreign matter from the encoder by breaking up the robot arm, replacing the encoder in the case where the scale is damaged, or replacing the robot arm is needed to restart the manufacture of the parts.

In the case of breaking up the robot arm to remove the foreign matter, there is a possibility that new foreign matter gets inside the encoder depending on the degree of cleanness in the factory. In addition, in the case of replacing the robot arm, there is a possibility that re-teaching, that is, resetting of an operation position of the robot is needed due to a mounting error of the robot arm or variation of manufacture of the robot arm, which takes more time for restoration. In either case, there is a problem that, when a reading error of the encoder occurs and the robot is stopped, the manufacture line needs to be stopped for restoration operation, and the manufacture efficiency of the manufacturing system decreases.

Therefore, in a configuration in which a first encoder, for example, an input shaft encoder, and a second encoder, for example, an output shaft encoder, are disposed as in Japanese Patent No. 5980965, correcting output of one encoder by output of the other encoder can be considered. However, the purpose of providing an output shaft encoder is obtaining accurate position information including the position error derived from the influence of twisting and backlash of the reduction gear coupled to the motor as described above. Therefore, for example, even if obtaining the position of the joint on the basis of the absolute position of the input shaft encoder is attempted, the error derived from the twisting and backlash of the reduction gear cannot be avoided. Therefore, there is a possibility that the error of control of the position and orientation of the robot arm increases.

Hence, in the case where, for example, a reading error occurs in the output encoder that directly measures the position of the joint, it is desirable to restore the output state of the output shaft encoder as quickly as possible without affecting the operation of the robot. In this case, it is desirable that a detection value of the output shaft encoder is not corrected by a detection value that is not supposed to be used as a substitute, such as the output of the input shaft encoder.

SUMMARY OF THE INVENTION

According to one aspect of the invention, a robot apparatus includes: a robot arm including a joint and links connected via the joint; a first encoder configured to detect information related to a position of the joint; and a second encoder configured to detect information related to the position of the joint independently from the first encoder, the second encoder including: a scale in which a pattern is formed; and a detector configured to relatively move with respect to the scale in a case where the joint operates, the detector being configured to detect position information of the joint by reading the pattern of the scale; and a controller configured to control an operation of the joint of the robot arm on a basis of detection results of the first encoder and the second encoder, the controller being configured to, in a case where a reading error occurs in the detector of the second encoder, execute encoder redetection processing of driving the joint of the robot arm on a basis of the detection result of the first encoder and redetecting the position information by the second encoder.

According to another aspect of the invention, a control method for controlling a robot apparatus with a joint connecting links of a robot arm and first and second encoders each configured to detect position information of the joint includes: error determination processing of determining whether a reading error has occurred in the second encoder; and encoder redetection processing of, in a case where it has been determined that the reading error has occurred in the error determination processing, driving the joint of the robot arm on a basis of a detection result of the first encoder, and redetecting the position information by the second encoder.

Further features of the present invention will become apparent from the following description of exemplary embodiments with reference to the attached drawings.

DESCRIPTION OF THE EMBODIMENTS

Exemplary embodiments of the present invention will be described with reference to attached drawings. To be noted, configurations described below are merely examples, and details thereof can be appropriately modified by one skilled in the art within the scope of the present invention. In addition, numerical values mentioned in the exemplary embodiments are values for reference and should not limit the present invention.

First Exemplary Embodiment (1) Configuration of Robot Apparatus

Figure 1:
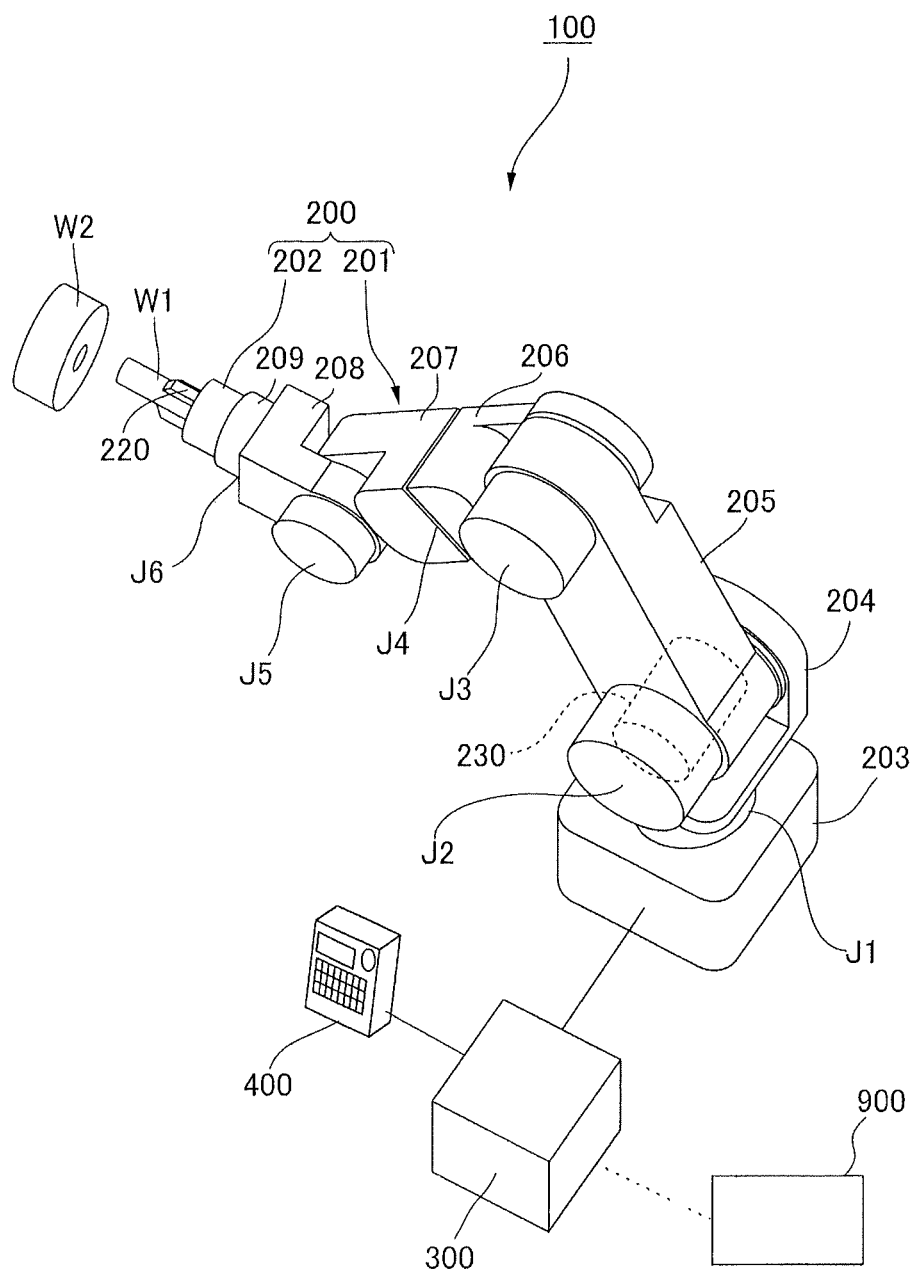
FIG. 1 is a perspective view of an exemplary robot apparatus that can implement the present invention.

FIG. 1 is a perspective view of a robot apparatus according to a first exemplary embodiment of the present invention. A robot apparatus 100 includes a robot 200, a control apparatus 300 serving as a controller configured to control the operation of the robot 200, and a teaching pendant 400 serving as a teaching portion configured to teach an operation of the robot 200 by an operation of a user. The robot 200 includes a multi-axis vertically articulated robot arm 201 and a robot hand 202 serving as an end effector attached to the distal end of the robot arm 201.

A manufacturing system of a manufacturing line or the like in a factory is typically constituted by a plurality of manufacturing machines including at least one robot arm 201 and a control system that harmonizes operations of the manufacturing machines. The control system refers to, for example, an integral control apparatus 900 such as a programmable logic controller: PLC that harmonizes the operations of the plurality of manufacturing machines by transmitting an instruction to the control apparatus 300 of each manufacturing machine as illustrated in FIG. 1. However, a distributed control system in which the control apparatus 300 of each manufacturing machine has a function of cooperating with other manufacturing machines may be employed instead of the integral control apparatus that performs control in a centralized manner.

In the robot arm 201, a base portion 203 fixed to a workbench and first to sixth links 204 to 209 that transmit displacement and force are bendably or rotatably connected via first to sixth joints J1 to J6. In this example, the robot arm 201 includes the joints J1 to J6 respectively corresponding to six axes of three bending axes and three rotation axes. Here, bending refers to bending at a point of a connecting portion between two links, and rotation refers to relative rotation of two links about the same rotation axis. Bending joints and rotating joints will be respectively referred to as bending portions and rotation portions.

The robot arm 201 includes the six joints J1 to J6, and, in this example, first, fourth, and sixth joints J1, J4, and J6 serve as rotation portions, and second, third, and fifth joints J2, J3, and J5 serve as bending portions. The robot hand 202 is an end effecter that is connected to the sixth link 209 serving as a distal end link and performs mounting operation of a workpiece W1 serving as a first workpiece, and includes a plurality of fingers 220. The workpiece W1 can be gripped by closing the plurality of fingers 220, and can be released from the gripping by opening the plurality of fingers 220. According to such an operation of the robot hand 202, for example, an assembly operation of mounting the workpiece W1 serving as a first workpiece on a workpiece W2 serving as a second workpiece can be performed. As a result of this, an article, for example, an arbitrary industrial product or a part thereof, including the workpieces W1 and W2 can be manufactured.

The joints J1 to J6 of the robot arm 201 are respectively provided with a plurality of joint driving portions 230 that drive these joints. In the present exemplary embodiment, six joint driving portions 230 are provided. In FIG. 1, only the joint driving portion 230 for the joint J2 is indicated by broken lines for the sake of convenience, and illustration of the joint driving portions 230 for the other joints J1 and J3 to J6 is omitted. However, the other joints J1 and J3 to J6 are also provided with the joint driving portions 230 having the same configuration. To be noted, although a case where all the joints J1 to J6 are driven by the joint driving portions 230 will be described in the present exemplary embodiment, it suffices as long as at least one of the joints J1 to J6 is driven by a joint driving portion 230.

An exemplary configuration of each joint driving portion of the robot arm 201 will be described by taking the joint driving portion 230 of the joint J2 as an example. It is assumed that the joint driving portions 230 configured in a similar manner are provided in the other joints J1 and J3 to J6 although the size and performance thereof may be different.

(2) Configuration of Joint Driving Portion 230 in Joint J2

Figure 3:
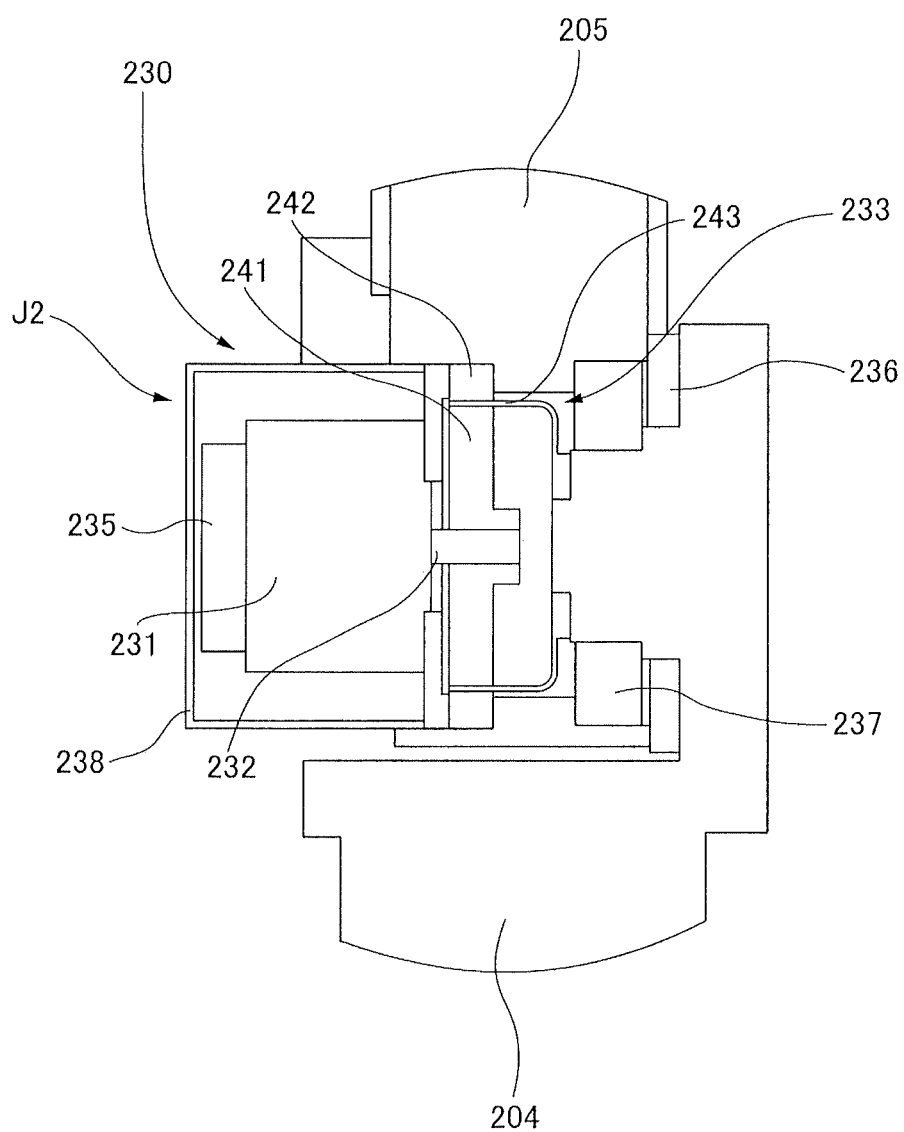
FIG. 3 is a partial section view of a joint of a robot arm illustrated in FIG. 1.

FIG. 3 is a partial section view of the joint J2 of the robot arm 201. The joint driving portion 230 includes a rotary motor 231 that is an electromagnetic motor, and a reduction gear 233 that reduces the rotation of a rotation shaft 232 of the rotary motor 231. The rotary motor 231 will be simply referred to as a motor. The reduction gear 233 serves as a transmission in the present exemplary embodiment. The motor 231 can be constituted by, for example, a servo motor such as an AC servo motor.

The joint driving portion 230 includes an input shaft angle detection portion at one of the rotation shaft 232 of the motor 231 and an input shaft of the reduction gear 233. In this example, an input shaft encoder 235 is provided as an input shaft angle detection portion that detects a rotation angle of the rotation shaft 232 of the motor 231. In addition, the joint driving portion 230 includes an output shaft encoder 236 as an output shaft angle detection portion that detects a rotation angle of an output shaft of the reduction gear 233.

The input shaft encoder 235 is preferably constituted by an absolute rotary encoder. For example, the input shaft encoder 235 includes a one-rotation absolute angle encoder, a counter of total number of rotations of the absolute angle encoder, a backup battery that supplies power to the counter, and so forth. By providing such a backup battery, even when the supply of power to the robot arm 201 is turned off, the value of total number of rotations in the counter is maintained regardless of whether the supply of power to the robot arm 201 is on or off. Therefore, for example, after reboot, control of the robot arm 201 can be started in the same position and orientation as the power off state. To be noted, although the input shaft encoder 235 is attached to the rotation shaft 232 on the rear side of the motor 231, that is, on the left side in FIG. 3 in this example, the input shaft encoder 235 may be attached to the input shaft of the reduction gear 233.

The output shaft encoder 236 of FIG. 3 is a rotary encoder that detects a relative angle between two links connected via a joint such as the base portion 203 and the link 204 of FIG. 1. In the case of the joint J2, the output shaft encoder 236 detects a relative angle between the links 204 and 205. The output shaft encoder 236 may have, for example, a configuration in which an encoder scale is disposed on the link 204 and a sensor unit thereof is disposed on the link 205. Alternatively, the positional relationship of the links 204 and 205 and the encoder scale and the sensor unit of the output shaft encoder 236 may be inverted from the positional relationship described above.

The links 204 and 205 are rotatably connected via a crossed roller bearing 237. The motor 231 is covered by a motor cover 238 for protection. An unillustrated brake unit can be provided between the motor 231 and the encoder 235. This brake unit is configured to, for example, brake when power is not supplied. By such a brake unit, for example, the orientation of the robot arm 201 when the power is off can be maintained.

A wave gear reducer that is small and light and has a large reduction ratio can be used as the reduction gear 233. The reduction gear 233 includes a wave generator 241 coupled to the rotation shaft 232 of the motor 231 and a circular spline 242 fixed to the link 205. The wave generator 241 serves as an input shaft and the circular spline 242 serves as an output shaft. To be noted, although the circular spline 242 is directly connected to the link 205, the circular spline 242 may be integrally formed with the link 205.

In addition, the reduction gear 233 includes a flexspline 243 disposed between the wave generator 241 and the circular spline 242 and fixed to the link 204. The flexspline 243 is decelerated by a reduction ratio N with respect to the rotation of the wave generator 241, and relatively rotates with respect to the circular spline 242. Therefore, the rotation of the rotation shaft 232 of the motor 231 is reduced by a reduction ratio of 1/N, and relatively rotates the link 205 to which the circular spline 242 is fixed with respect to the link 204 to which the flexspline 243 is fixed. As a result of this, the angle of the joint J2 is controlled.

Here, the input shaft encoder 235 is disposed upstream of, that is, on the input side of the reduction gear 233 in which an error derived from backlash, twisting, distortion, and the like can occur, and a joint angle of the joint J2 calculated from a detection value thereof by using the reduction ratio or the like is affected by the error described above. In contrast, the output shaft encoder 236 is disposed downstream of, that is, on the output side of the reduction gear 233, and is capable of detecting an actually measured value of the joint angle of the joint J2 that has been affected by the backlash, twisting, distortion, and the like of the reduction gear 233. Therefore, by using the output shaft encoder 236, the position information of the joint J2 can be obtained without being affected by the backlash, twisting, distortion, and the like of the reduction gear 233, and the position of the link 205 can be highly-precisely controlled on the basis of this.

(3) Configuration of Control Apparatus 300

Figure 2:
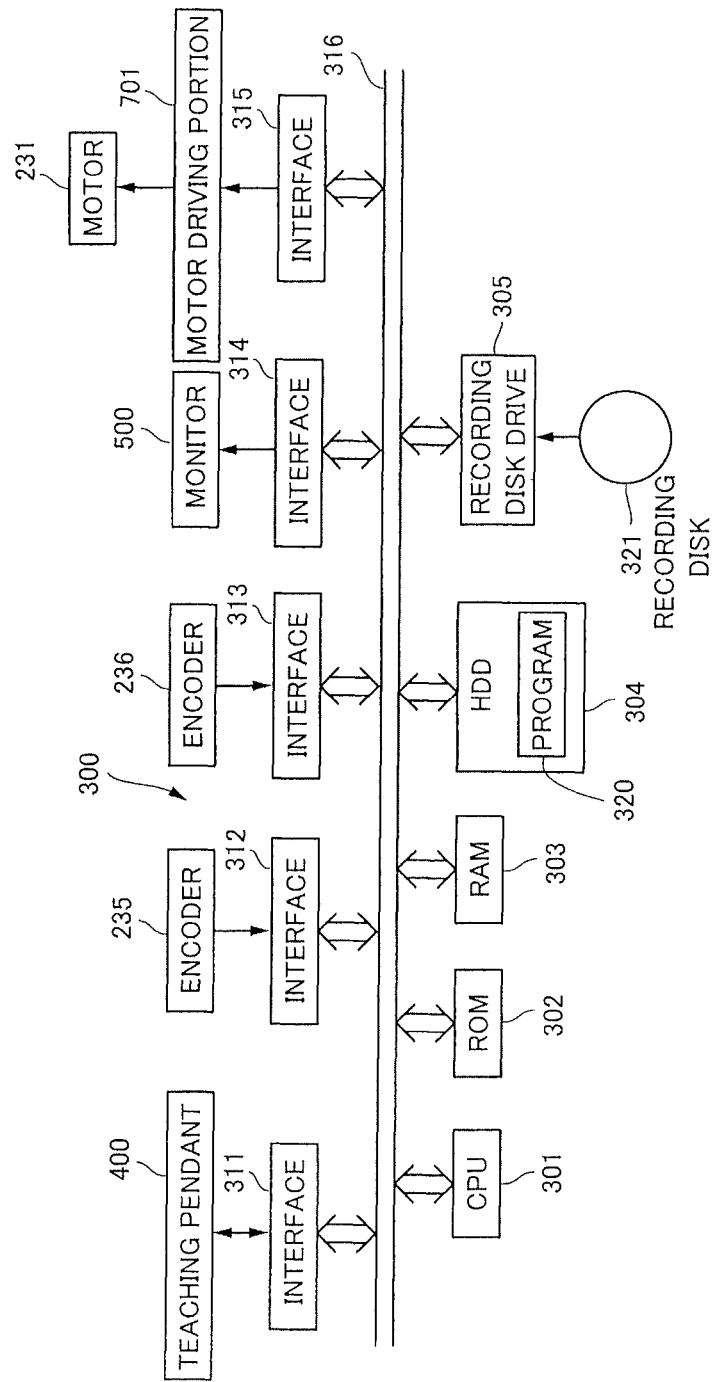
FIG. 2 is a block diagram of a controller illustrated in FIG. 1.

FIG. 2 illustrates a configuration of the control apparatus 300 of the robot apparatus 100. The control apparatus 300 of FIG. 2 includes a central processing unit: CPU 301 serving as a controller or a calculation portion. In addition, the control apparatus 300 includes a read only memory: ROM 302, a random access memory: RAM 303, and a hard disk drive: HDD 304 serving as storage portions. In addition, the control apparatus 300 includes a recording disk drive 305 and various interfaces 311 to 315.

The CPU 301 is connected to the ROM 302, the RAM 303, the HDD 304, the recording disk drive 305, and the various interfaces 311 to 315 via a bus 316. The ROM 302 stores a basic program such as a basic input/output system: BIOS. In the case where the HDD 304 or the like is not provided, the ROM 302 may be used as a storage unit for storing a program 320 for causing the CPU 301 to execute control that will be described later. The RAM 303 is used for temporarily storing various data such as results of calculation by the CPU 301.

The HDD 304 constitutes a storage device that stores results of calculation by the CPU 301, various data obtained from the outside, and the like. Although the storage device in the present exemplary embodiment is constituted by the HDD 304, a solid state drive: SSD or the like may be used. In addition, The HDD 304 can store the program 320 for causing the CPU 301 to execute the control that will be described later. In addition, the HDD 304 can store teaching position information including angle data of the output shaft encoder set by a user via the teaching pendant 400. The CPU 301 executes each step of a robot control method on the basis of the program 320 stored or recorded in the HDD 304 or the ROM 302. The recording disk drive 305 is capable of reading various data, programs, and the like recorded in a recording disk 321.

To be noted, the control program of the CPU 301 for realizing a control procedure that will be described later can be also stored in a storage portion such as the HDD 304, the ROM 302, or an electrically erasable programmable ROM: EEPROM area thereof. In this case, the control program of the CPU 301 for realizing the control procedure that will be described later can be supplied to each storage portion described above via a network or the like and updated to a new or different program. Alternatively, the control program of the CPU 301 for realizing the control procedure that will be described later can be supplied to each storage portion described above via storage media such as various magnetic disks, optical disks, and flash memories and drive apparatuses therefor, and thus the contents thereof can be updated. The storage media and storage portions in the state of storing the control program of the CPU 301 for realizing the control procedure described above each constitute a non-transitory computer-readable recording medium storing a control procedure of the present invention.

The teaching pendant 400 constituting a teaching portion of the robot arm 201 is connected to the interface 311. This teaching pendant 400 is used for designating teaching points to teach the robot 200, that is, target joint angles of the joints J1 to J6 serving as angle instruction values by an input operation of the user. Data of teaching points serving as teaching data is output to the CPU 301 or the HDD 304 via the interface 311 and the bus 316. The CPU 301 receives input of the teaching data from the teaching pendant 400 or the HDD 304 and thus is capable of performing arm control while operating in a taught manner. In addition, the CPU 301 is capable of reproducing an operation of the robot arm 201 in accordance with teaching data that has been already taught and stored in the HDD 304. As a result of this, for example, the robot arm 201 can perform a manufacturing operation of products or parts.

The input shaft encoder 235 described above is connected to the interface 312, and the output shaft encoder 236 is connected to the interface 313. The input shaft encoder 235 is a first encoder in the present exemplary embodiment, and the output shaft encoder 236 is a second encoder in the present exemplary embodiment. These first and second encoders output, for example, signals indicating angle detection values that have been detected. In the case where the encoders have a function of an absolute encoder, for example, absolute angle value data from a predetermined origin is output. However, in the case where the first and second encoders have a function of an incremental encoder, for example, the output signals are pulse signals. The CPU 301 receives input of the output signals from the input shaft encoder 235 and the output shaft encoder 236 via the interfaces 312 and 313 and the bus 316.

A display apparatus 500 constituting a display portion, which is a monitor in the present exemplary embodiment, is connected to the interface 314, and displays various data expressed by characters and images on the basis of control by the CPU 301.

A motor driving portion 701 is connected to the interface 315. The CPU 301 outputs, on the basis of the teaching data, driving instruction data indicating an amount of control of the rotation angle of the rotation shaft 232 of the motor 231 to the motor driving portion 701 at predetermined temporal intervals via the bus 316 and the interface 315.

For example, on the basis of a driving instruction input from the CPU 301, the motor driving portion 701 calculates an amount of output of current to the motor 231, supplies current to the motor 231, and thus controls the joint angles of the joints J1 to J6. Then, the motor 231 generates a driving torque in response to supply of power from the motor driving portion 701, and transmits the torque to the wave generator 241 that is the input shaft of the reduction gear 233. In the reduction gear 233, the circular spline 242 that is the output shaft thereof rotates by 1/N times the number of rotations of the wave generator 241. As a result of this, the link 205 relatively rotates with respect to the link 204. The CPU 301 controls driving of the joints J1 to J6 by the motor 231 via the motor driving portion 701 such that the joint angles of the joints J1 to J6 reach target joint angles.

To be noted, other unillustrated devices such as a rewritable nonvolatile memory and external storage devices such as an external HDD may be connected to the bus 316 via unillustrated interfaces.

(4) Operation of Output Shaft Encoder 236

Figure 4:
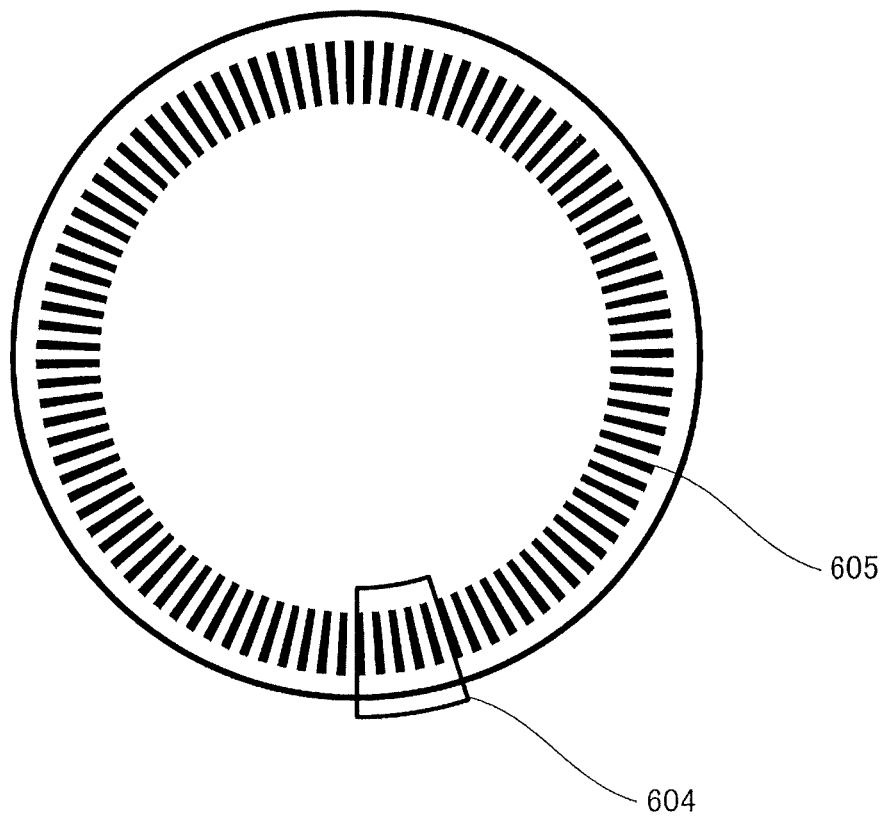
FIG. 4 is an explanatory diagram illustrating an overall structure of an optical encoder.

The output shaft encoder 236 is disposed in each of the joints J1 to J6. FIG. 4 illustrates an exemplary structure of the output shaft encoder 236. A zebra pattern in which portions with reflective films and portions without reflective films are alternately arranged in the circumferential direction is formed in a scale track 605, and a sensor unit 604 serving as a detector reads this zebra pattern, thereby pulse signals are output. For example, current position information can be obtained by counting the number of pulse signals output from the sensor unit 604. To be noted, although a configuration of an encoder is described by mentioning the output shaft encoder 236 herein, an equivalent configuration can be also applied to the input shaft encoder 235.

Figure 5:
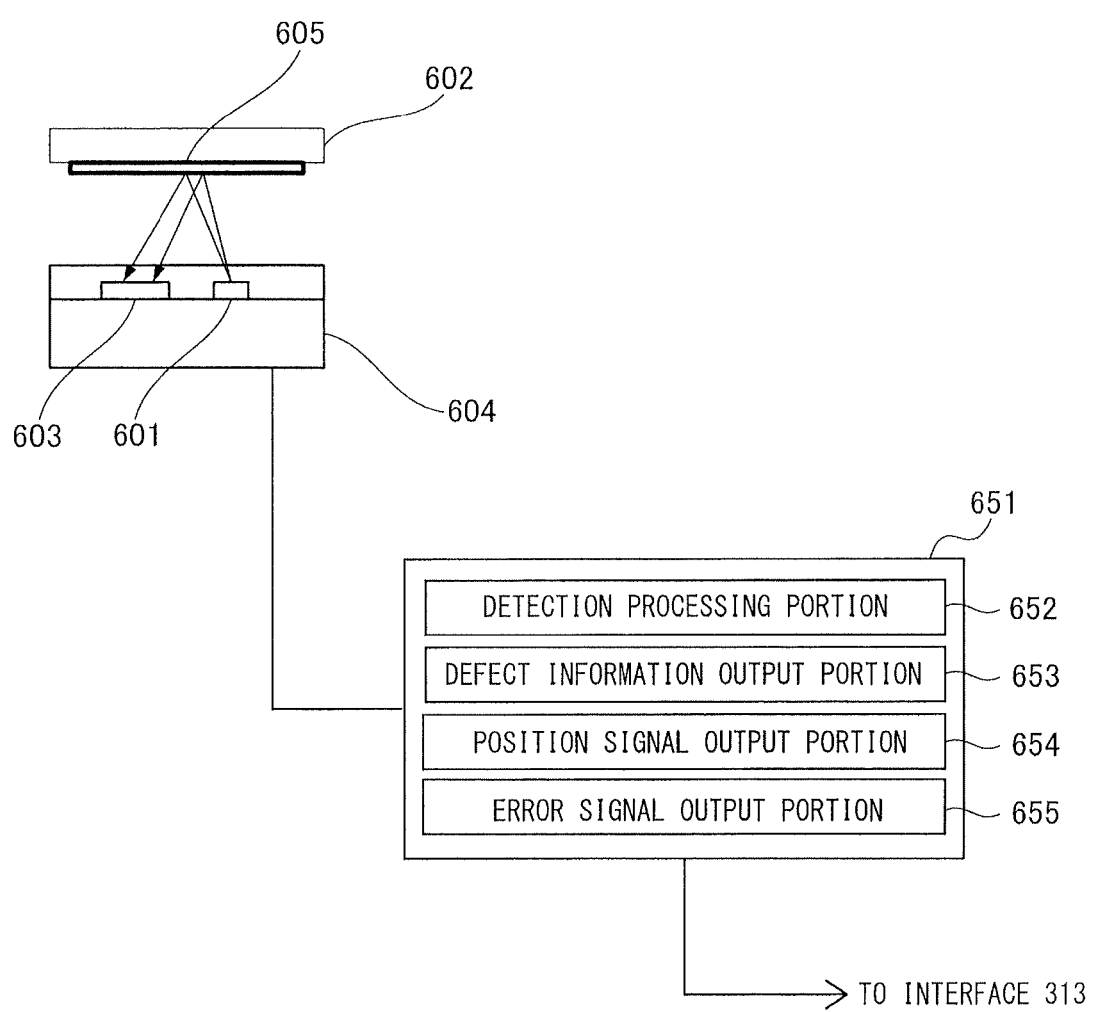
FIG. 5 is an explanatory diagram illustrating a structure of a sensor portion of the optical encoder.

FIG. 5 illustrates a typical configuration of an encoder device used as the output shaft encoder 236 or the input shaft encoder 235. The encoder illustrated in the upper left of FIG. 5 includes a scale 602 and the sensor unit 604 in which a light source 601 and a light receiving element 603 are integrated. Among these, the sensor unit 604 is constituted by, for example, the light source 601 such as a light emitting diode and the light receiving element 603 including a photodiode array. The scale 602 is constituted by, for example, forming a reflective film on a circular glass substrate. However, the substrate of the scale 602 is not limited to glass, and may be formed from resin or the like. Stable light output from the light source 601 can be obtained by, for example, driving the light emitting diode via a constant current circuit.

In FIG. 5, a light beam emitted from the light source 601 toward the scale 602 is reflected at a position at which the reflective film is formed and is not reflected at a position at which the reflective film is not formed. In the case where a reflective film is present on the scale 602, the light beam from the light source 601 is reflected on the scale 602, and the reflected light is received by the light receiving element 603. By amplifying the output of the light receiving element 603 and performing appropriate analog-to-digital: AD conversion processing, the output can be converted into digital pulse signals including Hi indicating presence of the reflective film and Lo indicating absence of the reflective film.

In addition, there is an encoder device that includes a signal processing portion 651 as illustrated in the lower right of FIG. 5. In this example, the signal processing portion 651 includes a detection processing portion 652, a defect information output portion 653, and a position signal output portion 654. The signal processing portion 651 generates a position signal compatible with an output specification of an absolute or incremental type from a digital pulse signal obtained from the light receiving element 603. The generated position signal is transmitted to the control system of FIG. 2, for example, the interface 313, via the position signal output portion 654.

In addition, there is a product of an encoder device including an error signal output portion 655 in the signal processing portion 651. The error signal output portion 655 is capable of monitoring the output signal of the light receiving element 603 and detecting an encoder error that will be described later. In the case where the error signal output portion 655 has detected the encoder error, the error signal output portion 655 transmits an error signal of a predetermined signal format to the control system of FIG. 2, for example, the interface 313.

To be noted, in the case where the encoder device includes a signal interface, for example, a signal line, for the error signal, the control system of FIG. 2 may monitor the signal interface. Alternatively, a specification in which the signal processing portion 651 does not include such a signal interface and the position signal output portion 654 outputs a special value indicating that the position information is invalid or undefined at the time of the encoder error can be considered. In this case, the control system of FIG. 2 may monitor whether a predetermined value corresponding to the encoder error is output from the position signal output portion 654.

In the case where the encoder device is capable of generating the error signal described above when the encoder error occurs, the control system of FIG. 2 performs encoder error determination by using this error signal. This determination will be also referred to as error detection. For example, an encoder reading error determination portion 706 illustrated in FIG. 8 may be implemented so as to determine whether the error signal output portion 655 generates an error signal. In the case where the error signal output portion 655 of the encoder device is not available, the encoder reading error determination portion 706 illustrated in FIG. 8 detects encoder errors of types that will be described later by, for example, monitoring the output of the position signal output portion 654.

Examples of the encoder include an absolute encoder capable of obtaining an absolute coordinate and an incremental encoder capable of obtaining a relative coordinate. Examples of configurations concerning the absolute encoder that is used as an output shaft encoder in a joint of a robot system include a configuration in which absolute data representing absolute position information keeps on being continuously obtained and a configuration in which the absolute encoder operates as an incremental encoder after obtaining the absolute data. In the former configuration, absolute data recorded in an encoder scale can be continuously obtained. In contrast, in the latter configuration, the current position is obtained by obtaining the absolute data recorded in the encoder scale, then counting the output of the incremental encoder, and adding or subtracting the difference thereof to or from absolute information.

Here, an example of a configuration of an absolute track and an incremental track incorporated in the output shaft encoder 236 will be described with reference to FIG. 6. In this example, the scale has a two-track configuration in which a scale of a small pitch having high-frequency information and a scale of a large pitch having low-frequency information are combined as illustrated in FIG. 6.

Figure 6:
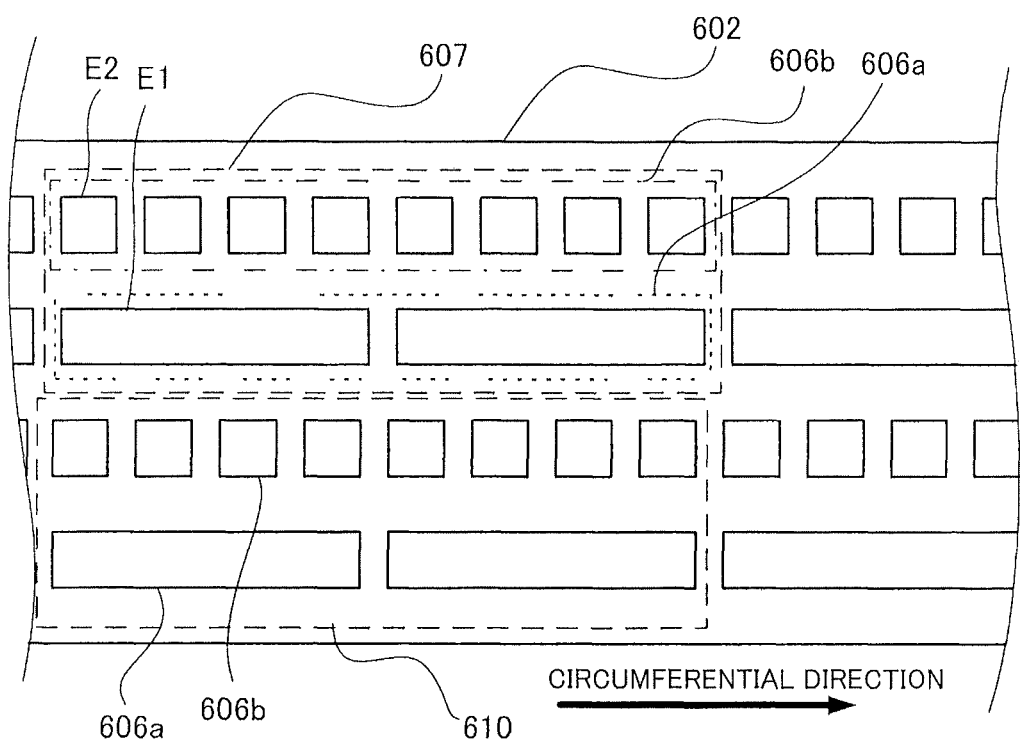
FIG. 6 is an explanatory diagram illustrating a structure of a scale of the optical encoder.

In FIG. 6, an absolute scale 607 that is collectively read by the sensor unit 604 in a scale reading range serving as a read area is disposed on the scale 602 of the encoder. The absolute scale 607 includes an incremental track 606b. That is, the absolute scale 607 includes an absolute track 606a in which first pattern elements E1 are arranged in the rotation direction of the scale 602 and an incremental track 606b in which second pattern elements E2 are arranged concentrically with the absolute track 606a. The absolute track 606a is a first track in the present exemplary embodiment, and the incremental track 606b is a second track in the present exemplary embodiment. An absolute scale 610, which is another pair of tracks illustrated in FIG. 6, is also constituted by the absolute track 606a and the incremental track 606b.

The pitch of the incremental track 606b, that is, the period of the pattern elements E2 is shorter than the pitch of the absolute track 606a, that is, the period of the pattern elements E1. Information for obtaining absolute data is embedded in the first pattern elements E1 in such a manner as to be readable by the sensor unit 604. Meanwhile, the pattern of the incremental track 606b is a simple alternate signal arrangement of 1 and 0 respectively corresponding to reflection and no reflection. As a method for embedding the information for obtaining the absolute data, that is, information for specifying the absolute position information of the joint, a known method such as a method of disposing a plurality of marks corresponding to the number of light receiving elements 603 in one pattern element E1 and expressing a sign by reflectivity of each mark can be employed.

The absolute tracks 606a on the upper and lower sides in FIG. 6 have phase difference, and the absolute position information can be calculated from the phase difference between the absolute track 606a of the scale 607 and the absolute track 606a of the scale 610. For example, the pattern elements E1 are formed in such a manner that a reading result of the absolute track 606a on the upper side changes at a period of one fourth of a rotation of the scale 602 and a reading result of the absolute track 606a on the lower side changes at a period of one fifth of the rotation of the scale 602. With this configuration, phase difference θ1-θ2 between a phase θ1 of the scale 607 and a phase θ2 of the scale 610 changes from 0° to 360° at a period of one rotation of the scale 602, and thus the absolute position information of the joint can be obtained by calculating the phase difference. Alternatively, the sensor unit 604 may read two tracks at different reading phases.

Figure 7:
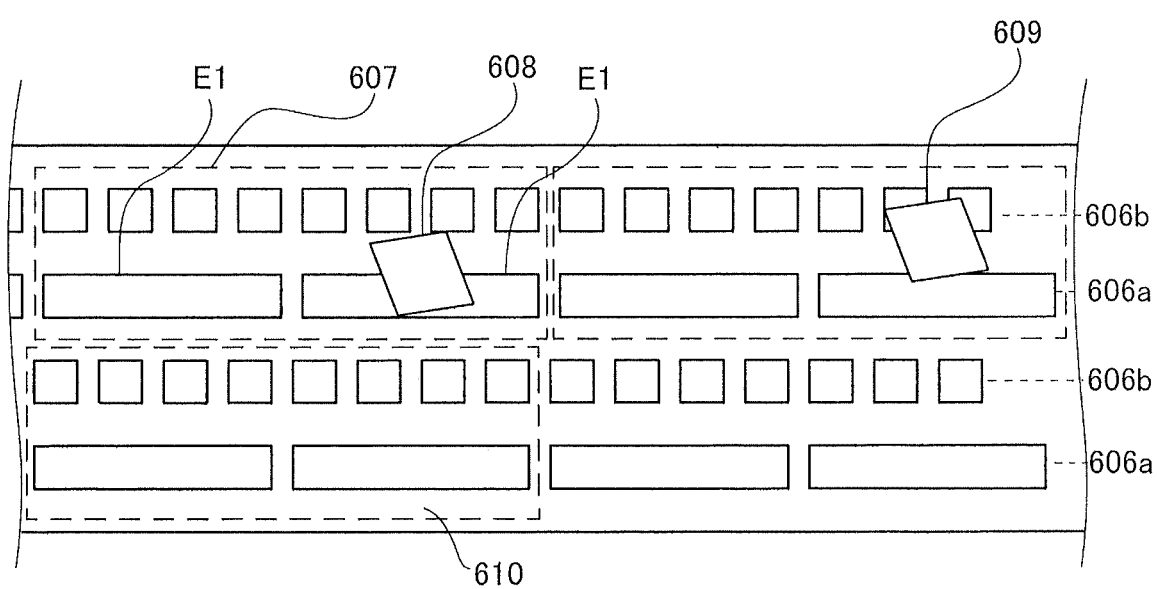
FIG. 7 is an explanatory diagram illustrating a relationship between the scale and a foreign matter attached to the scale.

In such a configuration as that illustrated in FIG. 6, in the case where the absolute track 606a including the position information of the absolute encoder and the incremental track 606b including the position information of the incremental encoder are concentrically arranged, the absolute track 606a is more likely to be affected by foreign matter and scratches, that is, more likely to suffer from an error, as illustrated in FIG. 7. As illustrated in FIG. 7, a reading range of the absolute scale 607 include parts of the absolute track 606a corresponding to two periods thereof, that is, two pattern elements El. However, in the case where a foreign matter 608 or a scratch is present on the scale, one of the two periods of the absolute track 606a having a low frequency is blocked by the foreign matter, and thus the frequency thereof is difficult to confirm. In contrast, in the case where a foreign matter 609 or a scratch overlaps the incremental track 606b of a short period used as an incremental scale, the sensor unit 604 can read scales of 5 or more periods from one reading range of the absolute scale 607. Therefore, in the positional relationship of the foreign matter 609 or a scratch illustrated in FIG. 7, it is not difficult to obtain incremental data in synchronization with output from the light receiving element 603 of the sensor unit 604. As described above, an incremental scale operation tends to be stronger against noises such as foreign matter and scratches than an absolute scale operation. In the present exemplary embodiment, control using such characteristics is performed.

(5) Details of Control System

Figure 8:
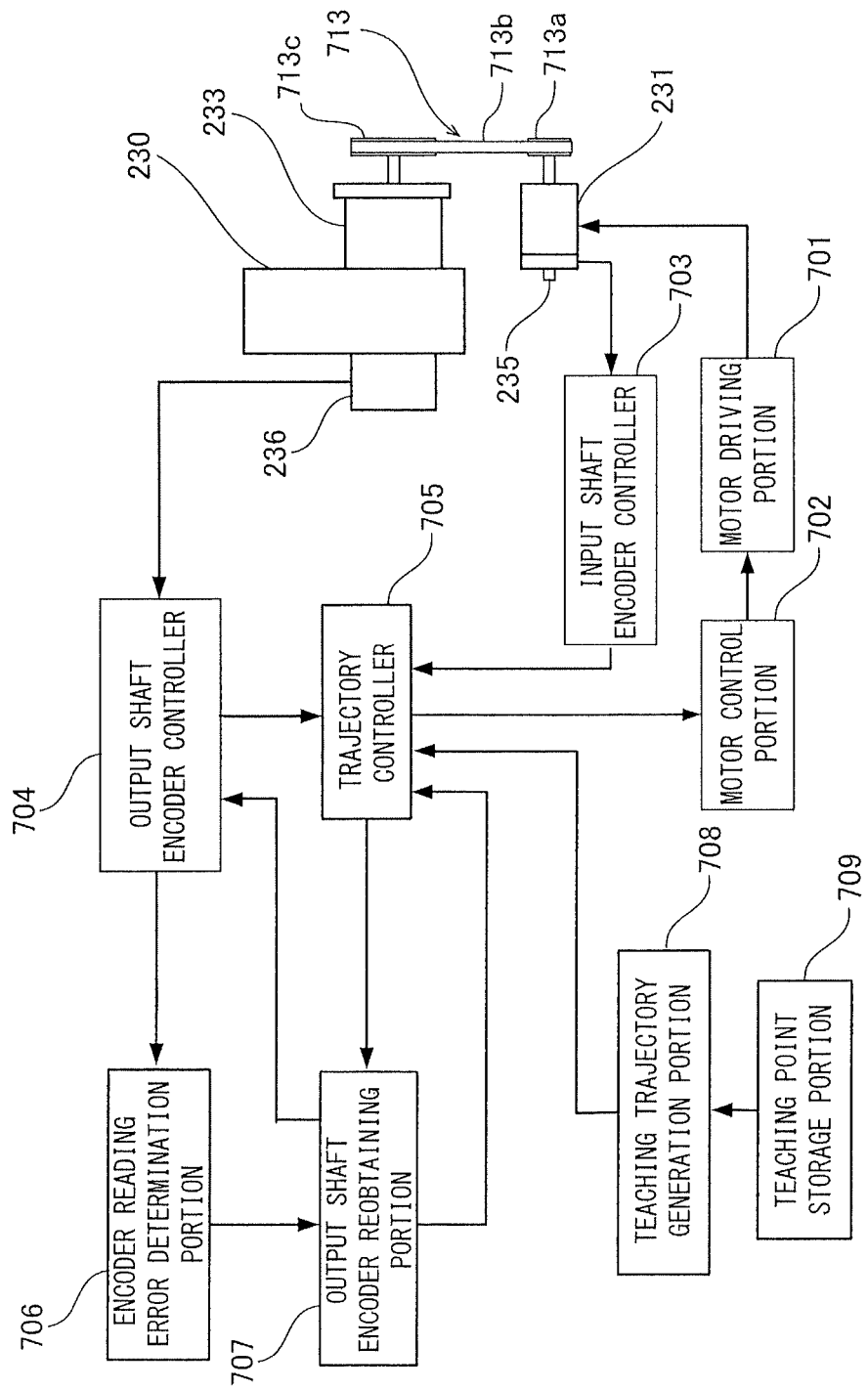
FIG. 8 is a block diagram of a control system according to a first exemplary embodiment.

FIG. 8 illustrates an example of a configuration of a joint driving system and a control system around an encoder thereof of the present exemplary embodiment. Each control block of FIG. 8 can be implemented as, for example, a control system of the CPU 301 illustrated in FIG. 2, that is, as a module executed by the CPU 301 or a micro computer or application specific integrated circuit: ASIC that exhibits a specific calculation function in accordance with an instruction from the CPU 301.

In FIG. 8, the motor 231 is, for example, an AC servo motor as described above, and is driven by applying a pulse-width modulation: PWM signal to each of windings U, V, and W whose details are not illustrated from the motor driving portion 701 illustrated in FIG. 2. In the example of FIG. 8, a rotational force of the motor 231 is transmitted to the reduction gear 233 via a belt drive 713 including a pulley 713a attached to the output shaft of the motor 231, a pulley 713c attached to the input shaft of the reduction gear 233, and a belt 713b looped over the pulleys 713a and 713c. The reduction ratio of this belt drive 713 is set to, for example, 1:1. The belt drive 713 may be replaced by a chain and sprockets or a gear train. Further, such a transmission mechanism is not always needed, and the motor 231 and the input shaft of the reduction gear 233 may be directly connected as illustrated in FIG. 3.

The reduction gear 233 includes a gear train that reduces the rotational force of the motor 231, and, for example, in the case where the gear ratio thereof is 50:1, the joint driving portion 230 disposed on the output side of the reduction gear 233 rotates once when the motor 231 rotates 50 times. As described above, the output shaft encoder 236 is disposed in the joint driving portion 230, and thus the angle of the joint driving portion 230 can be read.

The input shaft encoder 235 is disposed to detect the rotation angle of the motor 231, and in the case of a reduction gear of 50:1, the motor 231 needs to rotate 50 times when the joint driving portion 230 rotates once. Therefore, an absolute encoder capable of detecting the angle of multiple rotations of 50 or more rotations is used as the input shaft encoder 235.

The motor controller 702 is a feedback controller that performs feedback control by a method such as proportional integral differential: PID control. In recent years, mainly software control is performed by a micro computer. An output shaft encoder controller 704 controls the output shaft encoder 236. The output shaft encoder controller 704 calculates the absolute angle obtained from the combination of rough and fine tracks 606a and 606b disposed on the scale of the output shaft encoder 236 as illustrated in FIG. 6, and causes the output shaft encoder 236 to function as an absolute encoder. In addition, an input shaft encoder controller 703 is provided for controlling the input shaft encoder 235, and stores the absolute position of the encoder and makes error determination, on the basis of the output of the input shaft encoder 235.

To be noted, in FIG. 8, controllers 703, 704, and 707 and a determination portion 706 for respective encoders that have been described above or will be described below are illustrated as if these are blocks separate from the encoders 235 and 236 and constitute the control system of the CPU 301 illustrated in FIG. 2. However, the illustration of FIG. 8 is just for the sake of convenience. For example, the controllers 703, 704, and 707 and the determination portion 706 may be implemented as part of encoder devices constituting the encoders 235 and 236.

Further, a teaching point storage portion 709 of FIG. 8 stores teaching points to which the distal end of the robot arm 201 moves. The teaching point storage portion 709 is constituted by, for example, a storage area of the HDD 304 for storing the teaching data of the robot arm 201.

A teaching trajectory generation portion 708 calculates position information of each of the joints J1 to J6 of the robot arm 201 on the basis of the teaching points stored in the teaching point storage portion 709, and outputs the position information to a trajectory controller 705. The trajectory controller 705 generates control information that determines the amount of rotation of the motor controller 702 on the basis of the position information obtained from the output of the input shaft encoder controller 703 and the output shaft encoder controller 704 and trajectory information output from the teaching trajectory generation portion 708.

In the case where an encoder device includes the error signal output portion 655 illustrated in FIG. 5 as described above, an encoder reading error determination portion 706 performs error determination by an error signal output from the error signal output portion 655 to the output shaft encoder controller 704. In a configuration in which the error signal output portion 655 is not available, the encoder reading error determination portion 706 performs the error determination by, for example, distinguishing a value of the absolute position information output from the output shaft encoder 236 to the output shaft encoder controller 704. A configuration in which the output shaft encoder 236 is capable of outputting an error signal will be described below as an example.

The output shaft encoder controller 704 outputs error information in accordance with the state of the error signal line of the output shaft encoder 236 in the case where a light reception level of the light receiving element 603 of the output shaft encoder 236 is not sufficient, the case where a target frequency component is missing, or the like. The encoder reading error determination portion 706 performs the error determination on the basis of this error information.

In the present exemplary embodiment, in the case where the encoder reading error determination portion 706 detects the occurrence of an encoder error in the output shaft encoder 236, an output shaft encoder reobtaining portion 707 is caused to operate.

This output shaft encoder reobtaining portion 707 causes the trajectory controller 705 to move the robot arm 201 by a small amount, and "reobtains" an output shaft encoder value. This reobtaining is an encoder redetection processing of trying to read, by using the output shaft encoder 236 for example, the position information until the position information is successfully detected in the encoder without occurrence of an encoder error therein.

In a normal operation in which an encoder error has not occurred, the trajectory controller 705 controls the trajectory of the robot arm 201 in accordance with the trajectory of the teaching trajectory generation portion 708 on the basis of the information of the teaching point storage portion 709.

In the case where an encoder error is detected by the encoder reading error determination portion 706 in error determination processing, the trajectory controller 705 drives the robot arm 201 for "reobtaining" the output shaft encoder value described above. In this case, the trajectory controller 705 drives the joint driving portion 230 on the basis of a detection result of the "first encoder", and causes the position information of the output shaft encoder 236 to be redetected.

For example, in this "reobtaining" of the output shaft encoder value, which is an absolute value, the input shaft encoder 235 is used for determining the amount of control on the input side of the reduction gear 233 similarly to the normal operation. Therefore, the input shaft encoder 235 can be considered as a first encoder used for "reobtaining" the output shaft encoder value.

In addition, in this "reobtaining" of the output shaft encoder value, as another encoder that can be used by the trajectory controller 705 for redetecting the position information of a "second encoder", for example, incremental output of the output shaft encoder 236 can be considered. For example, an encoder device including a scale of a track configuration as described with reference to FIGS. 6 and 7 and capable of absolute output and incremental output is used as the output shaft encoder 236. In this case, absolute output and incremental output are possible, and this can be considered as the output shaft encoder 236 including an absolute encoder and an incremental encoder. In the case where an error occurs in the absolute encoder used for position control of the joint among these, the absolute data is "reobtained" by using the incremental encoder. In this case, in control described below, for example, as illustrated in FIG. 9, the incremental output of the output shaft encoder 236 is used for checking whether the "reobtaining" of the absolute data has been successfully performed.

As described above, the incremental encoder is strong against noises such as a foreign matter, a scratch, and the like on the scale. Therefore, even in the case where an error occurs in the absolute encoder of the output shaft encoder 236, the position information on the output side of the reduction gear 233 can be obtained by the incremental encoder with a high precision. As a result of this, highly reliable "reobtaining" of the absolute data becomes possible. In this case, for example, the robot arm 201 is moved by an amount corresponding to one track of the absolute scale 607, that is, corresponding to the length of an area indicated by broken lines that is a unit of a reading operation of the absolute scale 607, while monitoring a count value of the incremental track 606b of the output shaft encoder 236 illustrated in FIG. 6, and the reading error determination is performed again by the encoder reading error determination portion 706. This "reobtaining" of the absolute data is repetitively tried, for example, until the encoder reading error determination portion 706 no longer detects the encoder error.

Figure 9:
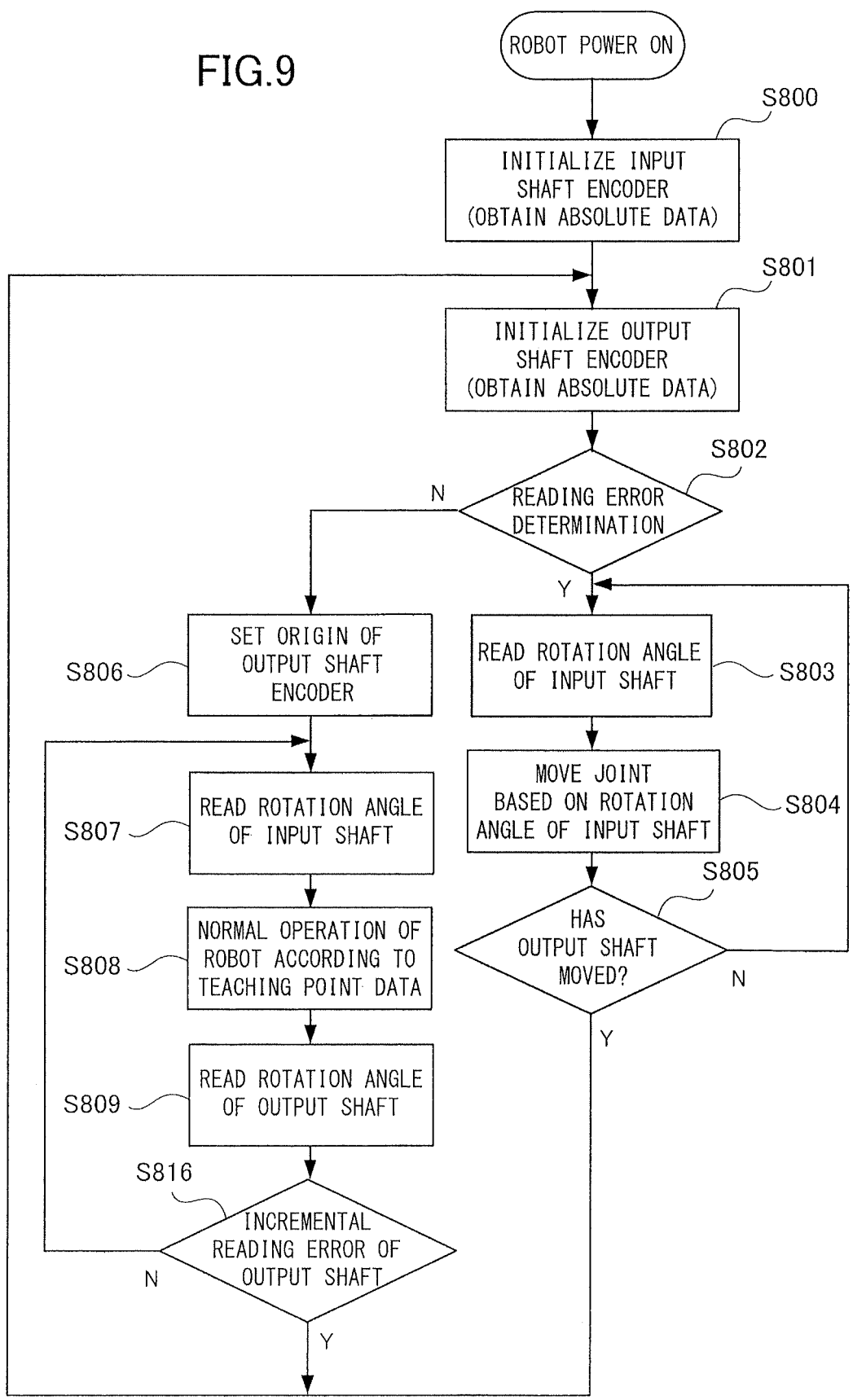
FIG. 9 is a flowchart illustrating a control procedure according to the first exemplary embodiment.

Here, a part of a robot control procedure in the control system of FIG. 2 particularly related to encoder control is illustrated in FIG. 9. The illustrated procedure can be, for example, stored in the ROM 302 or the HDD 304 as a control program for the CPU 301 serving as a controller.

In FIG. 9, when the power of the robot is turned on, the control apparatus 300 illustrated in FIG. 2 initializes the input shaft encoder 235 of each axis in the robot arm 201, and obtains absolute data in step S800. Next, in step S801, the output shaft encoder 236 is initialized to obtain absolute data.

Then, in step S802, whether an encoder error has occurred in the absolute output of the output shaft encoder 236 is determined. This encoder error determination is performed by, for example, the encoder reading error determination portion 706 described above.

In the case where no reading error has occurred, an origin of the output shaft encoder is set in step S806. Here, the output shaft encoder 236 stores the absolute data as the origin, that is, an initial value, and counts absolute coordinates while performing incremental operation from the origin. This counting of absolute coordinates can be performed by a normal incremental or decremental counter. After setting the origin in step S806, the rotation angle is read from the input shaft encoder 235 in step S807, and the robot arm 201 is caused to perform normal operation on the basis of the teaching point data in step S808. Then, for example, in a process requiring high precision of teaching point for operating the robot arm 201, the rotation angle is read from the output shaft encoder 236 in step S809, and the robot arm 201 is operated on the basis of this angle. By repeating this operation, that is, the loop of steps S807 to S809, precise assembly of an article can be performed by using the robot arm 201.

Incidentally, there is also a case where the output of the light receiving element 603 decreases due to failure of the element or the like and the output shaft encoder 236 outputs an error signal regarding the incremental encoder included in the output shaft encoder 236. In consideration of this case, in FIG. 9, step S816 is provided in the loop of steps S807 to S809. This step S816 is a step for detecting an incremental value reading error of the output shaft encoder 236. In the case where the incremental value reading error is detected in step S816, the control returns to step S801 to initialize the output shaft encoder 236. In the case where the incremental value reading error is not detected in step S816, the loop of steps S807 to S809 is continued.

In contrast, in the case where an encoder error is detected in the absolute output of the output shaft encoder 236 in step S802, the control transitions to step S803. In step S803, a rotation angle is read from the input shaft encoder 235, and a joint shaft is rotated by a predetermined amount based on the read input shaft rotation angle in step S804. For example, the predetermined amount is such a small amount that the robot arm 201 would not collide with objects therearound. Then, whether the incremental data output from the output shaft encoder 236 has changed by an amount corresponding to the absolute data of one track, that is, an amount corresponding to one reading range of the absolute scale 607 illustrated in FIGS. 6 and 7, of the output shaft encoder 236, is checked in step S805. In other words, whether the joint has slightly moved is checked in step S805. To be noted, as described above, the incremental track 606b of the output shaft encoder 236 illustrated in FIG. 6 is stronger against noises such as a foreign matter and a scratch on the scale than the absolute track 606a. Therefore, the determination of step S805 can be precisely and reliably executed by using the incremental data output from the output shaft encoder 236. In addition, although the joint is driven by an amount corresponding to one reading range of the absolute scale 607 as the predetermined amount in redetection of the absolute data in the present exemplary embodiment, the driving amount of the joint can be any amount as long as the amount is equal to or larger than the resolution of the output shaft encoder 236 as the absolute encoder.

In the case where the result of this determination of step S805 is positive, the control returns to step S801, the output shaft encoder 236 is initialized again, and the absolute data is obtained again. Then, in step S802, the encoder error determination is performed as described above, and the normal operation of step S806 and subsequent steps are performed when the encoder error is no longer detected. The redetection operation of steps S803 to S805 described above is repeated while the encoder error is detected in step S802.

In this manner, in the present exemplary embodiment, the absolute position can be redetected or reobtained in the case where an encoder error occurs in the output of absolute data from the output shaft encoder 236. Generally, absolute position information can be obtained from at any position of the absolute scale. For example, the absolute coordinate of any position on the output axis of the joint can be obtained by counting reading results of the incremental track 606b from the position of the origin whose absolute coordinate is obtained in step S806. Therefore, when obtaining the absolute data of the output shaft encoder 236 fails at a certain joint position, the absolute data of the output shaft encoder 236 can be reobtained at a different joint position by moving the joint by using the input shaft encoder 235. Then, after reobtaining the absolute data, the joint can be operated with reference to a joint position indicated by the absolute data obtained in the redetection operation of steps S803 to S805. That is, in a state after the redetection operation, the absolute data obtained by the redetection operation is set as the initial value of the position information. Then, after the redetection operation, the absolute position information of the joint can be continuously grasped by causing the output shaft encoder 236 to function as an incremental encoder and adding or subtracting the incremental data obtained from the output shaft encoder 236 to or from the initial value. In this manner, according to the present exemplary embodiment, stop of the robot arm 201 due to the encoder error in the joint is reduced, thereby the manufacturing line, that is, the manufacturing system is rarely forced to stop. As a result of this, the operating rate of the manufacturing line in which the robot arm 201 is disposed increases, and as a result, the manufacture efficiency of the article, for example, an industrial product or a part thereof, can be greatly improved.

Figure 10:
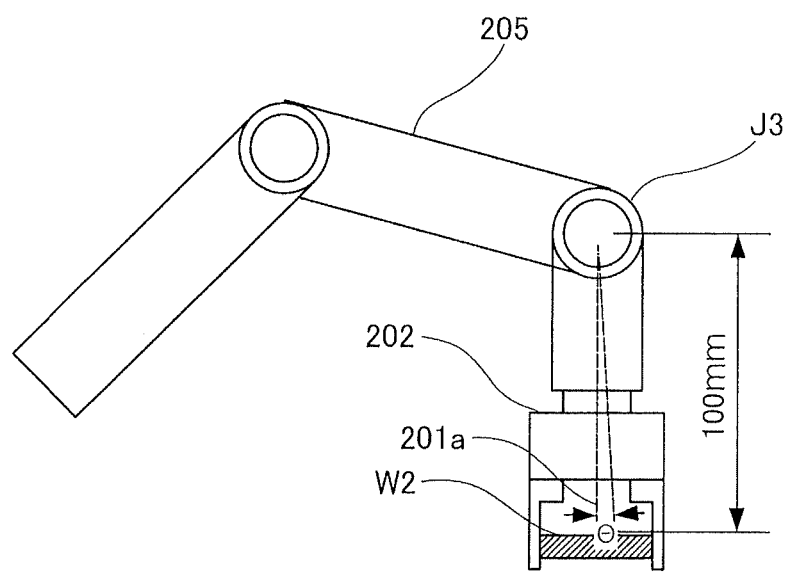
FIG. 10 is an explanatory diagram illustrating a relationship between an encoder value and a distal end position according to the first exemplary embodiment.

FIG. 10 illustrates an example of a dimension from the joint J3 of the robot arm 201 to the center portion of the robot hand 202 gripping the workpiece W2 at the distal end of the robot arm 201, and this dimension is about 100 mm in this example. In this case, considering a typical reduction ratio of the reduction gear 233, a movement amount 201a of the distal end of the robot arm 201 corresponding to the absolute data of one track in the reobtaining from the output shaft encoder 236 is not more than about 1.5 mm as illustrated in FIG. 10. Although it depends on the application of the robot arm 201, even if the robot arm 201 is operated once or several times in this order for reobtaining from the encoder, the movement is often within a range of error from a planned robot trajectory. Therefore, even if reobtaining from the encoder is performed in spite of the planned robot trajectory, the operation of the robot is hardly affected. In addition, for example, by selecting such a position and orientation as not to interfere with obstructs therearound in setting of a home position, that is, an initial position and orientation of the robot arm 201, movement of an amount corresponding to ten to several tens of tracks 607 illustrated in FIGS. 6 and 7 is considered to be possible for the reobtaining.

In addition, an upper limit number of operations of the joint for the reobtaining may be set. For example, ten to several tens of units may be set by using absolute data of one track 607 illustrated in FIGS. 6 and 7 as a unit. By determining the upper limit number of operations of the joint for the reobtaining, error processing of causing emergency stop of the robot arm 201 can be performed in the case where the absolute position cannot be obtained even when the joint is operated for the reobtaining the upper limit number of times.

(6) Merit of First Exemplary Embodiment

As described above, according to the first exemplary embodiment, the absolute position can be redetected or reobtained even in the case where a foreign matter, dust, or scratch is present on the scale of the output shaft encoder 236 of the robot joint. In the present exemplary embodiment, this redetection or reobtaining of the absolute position is performed by slightly moving the joint of the robot arm 201 while adjusting the input of the reduction gear 233 by the input shaft encoder 235. In this process, whether the joint has moved in step S805 of FIG. 9 is checked by using the incremental output of the output shaft encoder 236. According to the present exemplary embodiment, by such control, the absolute position information of the output shaft encoder 236 can be reobtained when the joint moves to a position where no foreign matter, dust, or scratch is present on the scale. According to the present exemplary embodiment, the robot arm 201 does not have to be stopped due to error even in the case where an encoder error occurs in the output shaft encoder 236. Therefore, the absolute position information of the output shaft encoder 236 can be reobtained, and thus steps of manufacture of an article are not delayed.

In addition, in the present exemplary embodiment, the value of the input shaft encoder 235 is used for controlling the input amount of the reduction gear 233 until reobtaining the absolute position information of the output shaft encoder 236. However, the output value of the input shaft encoder 235 is not substituted for the actual angle of the robot joint or a calculated value thereof as in the conventional technique. Therefore, according to the present exemplary embodiment, even when an encoder error occurs, the robot arm 201 can be restored to the state where the absolute coordinate of the output shaft encoder 236 can be automatically obtained by repetitively performing the redetection or reobtaining of the absolute position. Therefore, highly-precise joint position information can be used during almost the whole period of the manufacture process of the article by the robot arm 201 by using the absolute position on the output side of the reduction gear 233, which is not affected by the twisting and backlash of the reduction gear 233. Therefore, the robot arm 201 can be operated highly precisely and reliably, and thus the robot arm 201 can be caused to perform precise manufacture operation of the article.

Second Exemplary Embodiment

In the first exemplary embodiment described above, basic control of operating the robot, particularly a joint thereof for reobtaining the absolute value of the joint position in the case where an encoder error occurs in the output shaft encoder 236 has been shown. In the first exemplary embodiment, it has been shown that it can be possible to reobtain the absolute coordinate on the scale by avoiding foreign matter and scratches on the scale by an operation of joint corresponding to one or several units of the absolute track 607 illustrated in FIG. 6 for the reobtaining from the encoder. Some different configurations can be considered regarding details of forms of robot operations for the reobtaining from the encoder. In the second exemplary embodiment and the other exemplary embodiments, various examples of configuration regarding details of the forms of robot operations for the reobtaining from the encoder will be shown.

In the first exemplary embodiment, in the case where an error is detected by the encoder reading error determination portion 706, the joint of the robot arm 201 is driven while monitoring the incremental output obtained from the incremental track 606b of the output shaft encoder 236, and thus the reobtaining is performed. In the reobtaining operation of the first exemplary embodiment, the motor 231 is driven until the absolute position information is obtained on the basis of information of the input shaft encoder 235.

However, in the case where the robot arm 201 is actually installed in a factory, normally there are obstructs therearound such as tools, other robots, and structures of the building. Therefore, there is a possibility that the robot arm 201 interferes with, collides with, or touches the obstructs described above in the case where the robot arm 201 is randomly operated by only setting a condition that the absolute position information can be obtained as a requirement.

Meanwhile, positions at which the obstructs in the surroundings can be avoided are selected as teaching points for determining the robot trajectory at the time of operating the robot arm 201 in an actual installation environment are selected. That is, it can be considered that interference with obstructs hardly occurs at the teaching points included in the teaching data and positions in the vicinity thereof.

Therefore, in the second exemplary embodiment, a configuration of obtaining the absolute coordinate of the output shaft encoder 236 at a position of a teaching point included in the teaching data of the robot arm 201 serving as teaching information will be described. In the second exemplary embodiment and the other exemplary embodiments, parts different from the configuration of the first exemplary embodiment serving as a basic configuration will be described. The same reference signs will be used for members and control that have been already described in the first exemplary embodiment, and detailed descriptions thereof will be omitted.

Figure 11:
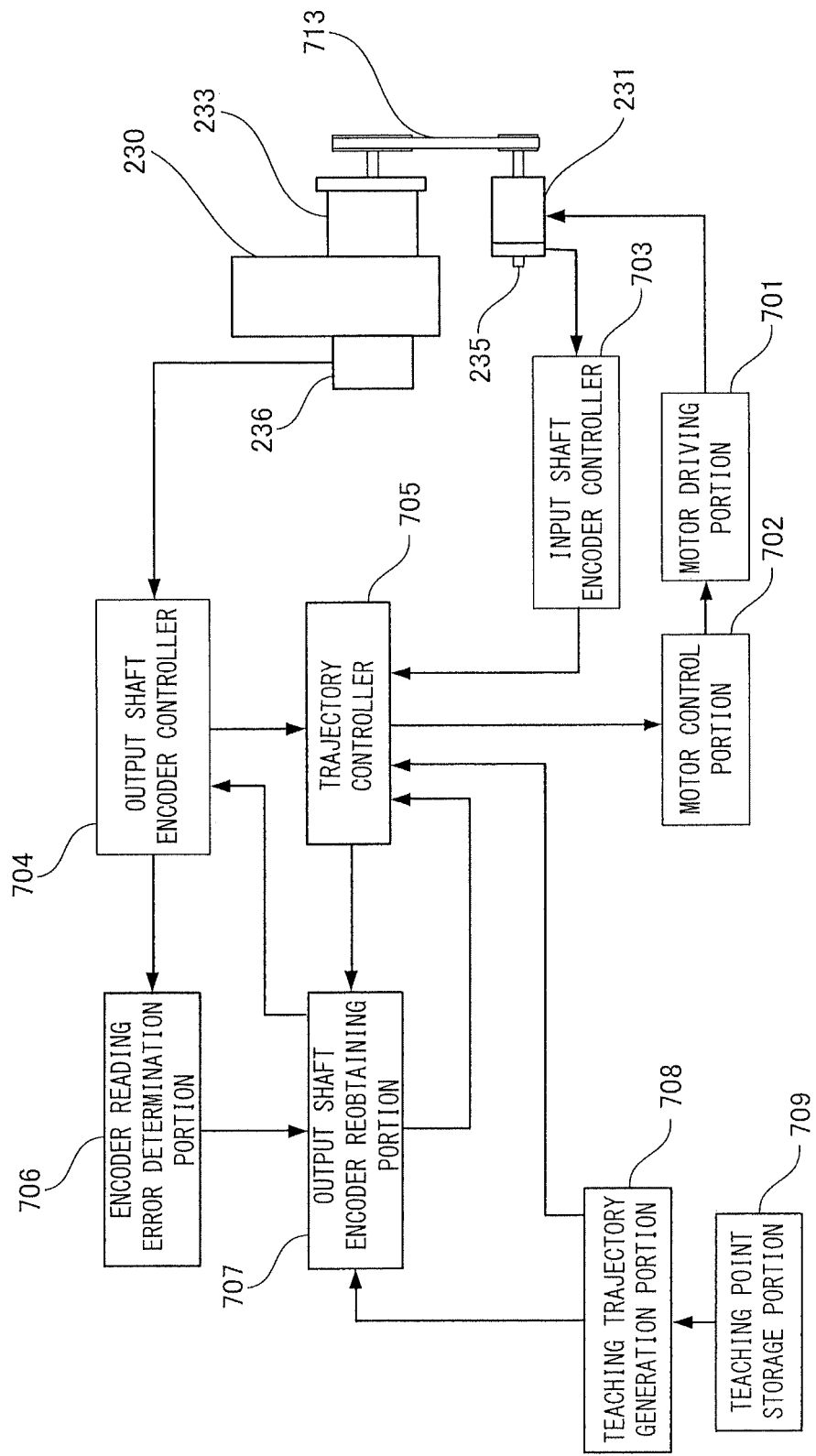
FIG. 11 is a block diagram of a control system according to a second exemplary embodiment.

FIG. 11 illustrates a functional block diagram of a control system of the present exemplary embodiment in a similar manner to FIG. 8 of the first exemplary embodiment. As illustrated in FIG. 11, in the second exemplary embodiment, the output of the teaching trajectory generation portion 708 is input in the output shaft encoder reobtaining portion 707. In addition, the determination output side of the encoder reading error determination portion 706 is connected to the input side of the output shaft encoder reobtaining portion 707. When the encoder reading error determination portion 706 detects a reading error, the output shaft encoder reobtaining portion 707 performs an operation of moving a standard portion of the arm to, for example, the closest teaching point position, and stopping the arm there, on the basis of the teaching point information of the teaching trajectory generation portion 708. That is, in the reobtaining operation of the present exemplary embodiment, the movement to the next teaching point on the planned robot trajectory is used for enabling the sensor unit 604 of the output shaft encoder 236 to read a position of the absolute scale where no foreign matter or scratch is present.

The operation of stopping the arm at a teaching point position for performing the reobtaining operation of the present exemplary embodiment on the basis of error detection is the same as a normal operation of stopping the arm at a teaching point position. That is, the trajectory controller 705 transmits a motor stopping instruction to the motor controller 702 to temporarily stop the robot arm 201. For example, at this time, obtaining the absolute data is tried, which corresponds to initialization of step S801 illustrated in FIG. 12, and a determination state of the encoder reading error determination portion 706 is examined. Then, in the case where it is determined that an error has not occurred in step S802, the output shaft encoder controller 704 sets the origin of the output shaft encoder 236 in step S806. Then, an instruction to change a mode of the output shaft encoder 236 from, for example, an absolute mode of reading the absolute scale 607 to an incremental mode of reading the incremental track 606b is generated.

Figure 12:
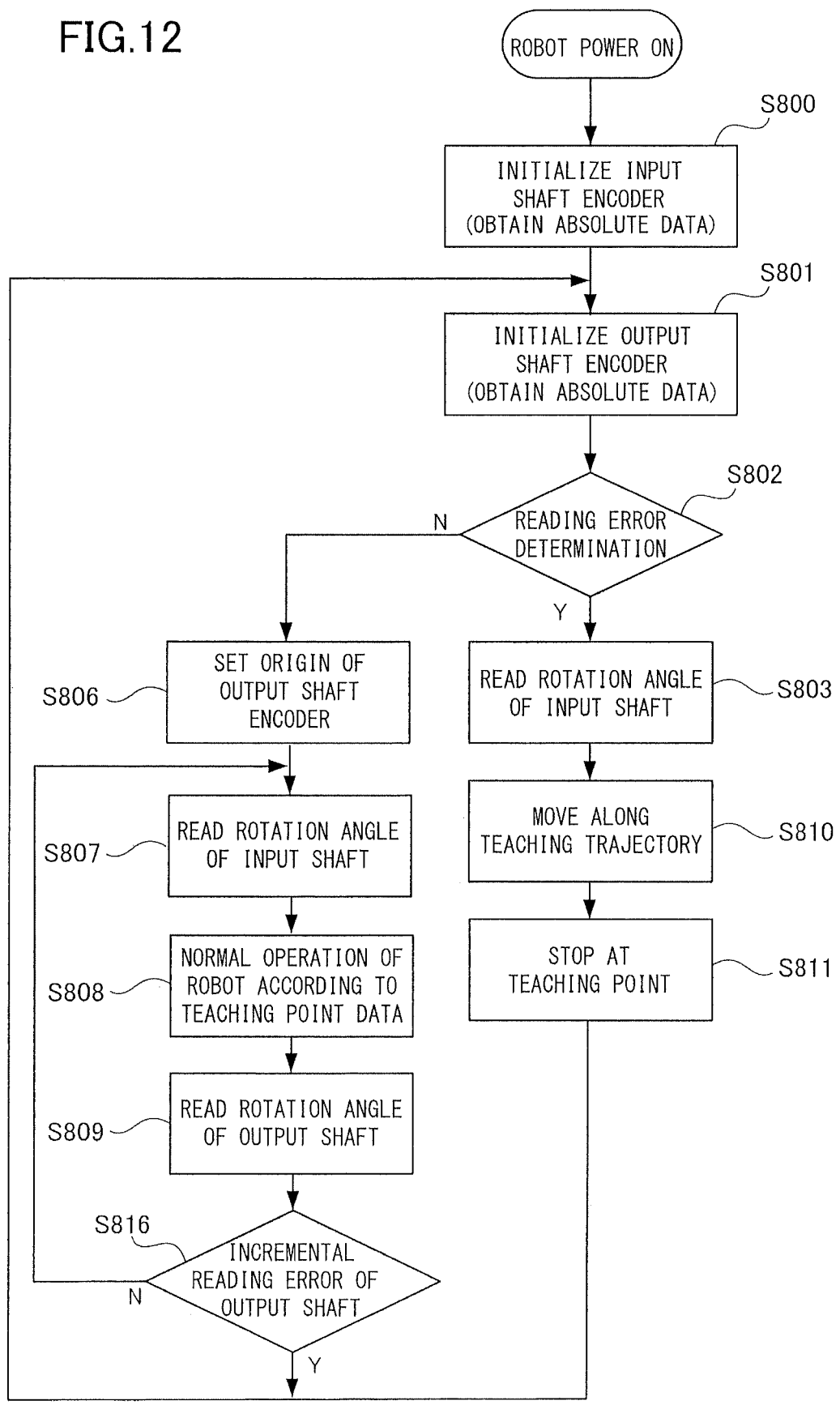
FIG. 12 is a flowchart illustrating a control procedure according to the second exemplary embodiment.

A flow of the control of the present exemplary embodiment described above is shown in a flow chart of FIG. 12. The form of illustration of FIG. 12 is similar to that of FIG. 9, and the same processing steps are denoted by the same step numbers as in FIG. 9. In FIG. 12, only control in branching steps S803, S810, and S811 after the encoder reading error determination portion 706 detects a reading error in step S802 is different from FIG. 9, and the other elements are the same as in FIG. 9.

In the case where it is determined that an error has occurred in the reading error determination of step S802, similarly to the case of FIG. 9, an encoder value is read from the input shaft encoder 235 in step S803. Then, in step S810, the operation of moving the standard portion of the robot arm 201, to the next teaching point, is performed on the basis of the teaching point information of the teaching trajectory generation portion 708. The encoder output of the input shaft encoder 235 read in step S803 is used for determining the driving amount of the motor 231 for moving the standard portion of the robot arm 201 to the teaching point position. When the motor 231 is driven by a predetermined driving amount, the standard portion of the robot arm 201 stops at the target teaching point in step S811. Then, the control transitions to step S801 similarly to the case of FIG. 9.

In step S801, the absolute data is obtained again, and the control transitions to step S802. In the case where it is determined that a reading error has occurred again in step S802, the control proceeds to steps S803, S810, and S811, and the robot arm 201 is moved to the next teaching point. To be noted, the case of using the teaching point data for the movement for the redetection or reobtaining of the absolute position includes a case where the joint in which the encoder error has occurred does not move. In this case, the control described above is repeated until the joint is driven and the redetection or reobtaining is successfully performed. In the case where the operation described above is repeated and the error is eliminated, the control proceeds to step S806 similarly to the case of FIG. 9, the origin of the output shaft encoder 236 is set, and the control transitions to the normal operation.

In the case where the encoder error is eliminated, that is, in the flow from step S802 to step S806, the output shaft encoder 236 stores the absolute data is stored as the origin in the origin setting of step S806, and the absolute coordinate is counted while performing incremental operation from that position. This counting is possible in both incremental and decremental directions. Control of subsequent steps S807, S808, S809, and S816 is similar to that described with reference to FIG. 9.

As described above, according to the second exemplary embodiment, redetection or reobtaining of the absolute position is possible even in the case where a foreign matter, dust, or scratch is present on the scale of the output shaft encoder 236 of the robot joint and an encoder error occurs. In this case, in the redetection or reobtaining of the absolute position in the second exemplary embodiment, the arm is driven by using, for example, teaching point data describing a robot operation for manufacturing an article unlike the operation of the first exemplary embodiment in which a specific joint is randomly moved by a small amount. In this redetection or reobtaining of the absolute position, the joint is operated by moving the robot arm 201 along the teaching trajectory, and the absolute position of the output shaft encoder 236 is reobtained at a teaching position. Therefore, the absolute coordinate of the output shaft encoder 236 can be reobtained without causing the problem of interference of the arm even in a state in which the robot arm 201 is installed in a factory and there are obstructs therearound. As a result, by obtaining highly-precise position information not affected by the twisting and backlash of the reduction gear 233 and operating the robot arm 201 on the basis of this, for example, highly-precise manufacture of an article is possible.

Third Exemplary Embodiment

In the second exemplary embodiment, in the case where it is determined that an encoder reading error has occurred by the encoder reading error determination portion 706, the robot arm 201 is moved to the next teaching point along the teaching trajectory, and re-reading of the output shaft encoder 236 is tried at a teaching point position. In a third exemplary embodiment, an example in which the re-reading of the output shaft encoder 236 is tried on a teaching trajectory between a certain teaching point and the next or the closest teaching point will be described. The trajectory of moving the robot arm 201 between teaching points is often generated by some kind of interpolation operation. In this case, the possibility of occurrence of interference with obstructs around the arm greatly decreases as compared with the case where the reobtaining is performed by moving the joint randomly.

Figure 13:
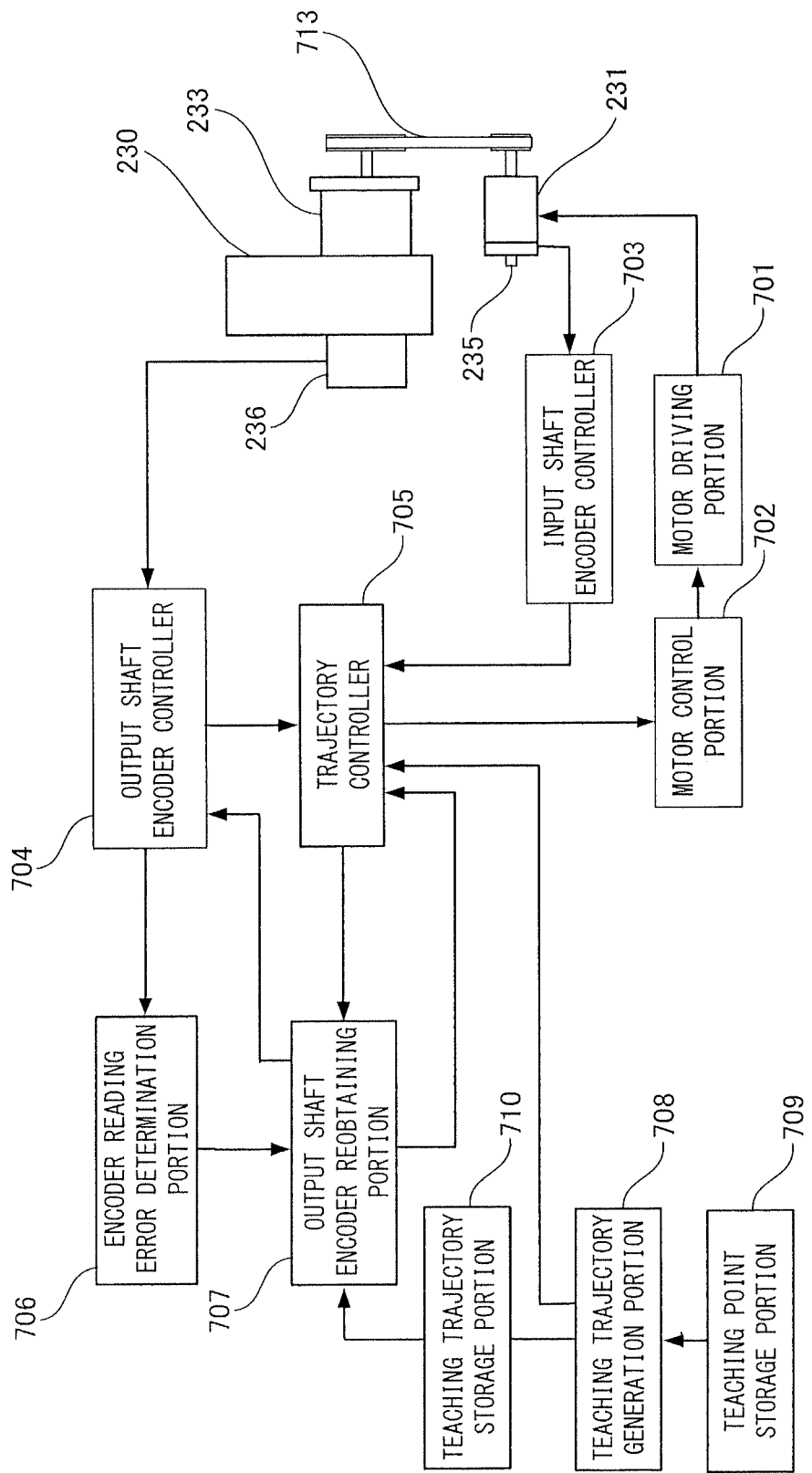
FIG. 13 is a block diagram of a control system according to a third exemplary embodiment.

FIG. 13 illustrates a configuration of a control system around the joint of the present exemplary embodiment. The form of illustration of FIG. 13 is similar to that of FIG. 11, and difference of FIG. 13 from FIG. 11 is that a teaching trajectory storage portion 710 that stores or buffers a teaching trajectory generated by the teaching trajectory generation portion 708 by performing interpolation between teaching points or the like is provided. The output shaft encoder reobtaining portion 707 is capable of referring to the teaching trajectory storage portion 710 and selecting one point on the trajectory as a movement target position for reobtaining the absolute position.

Figure 14:
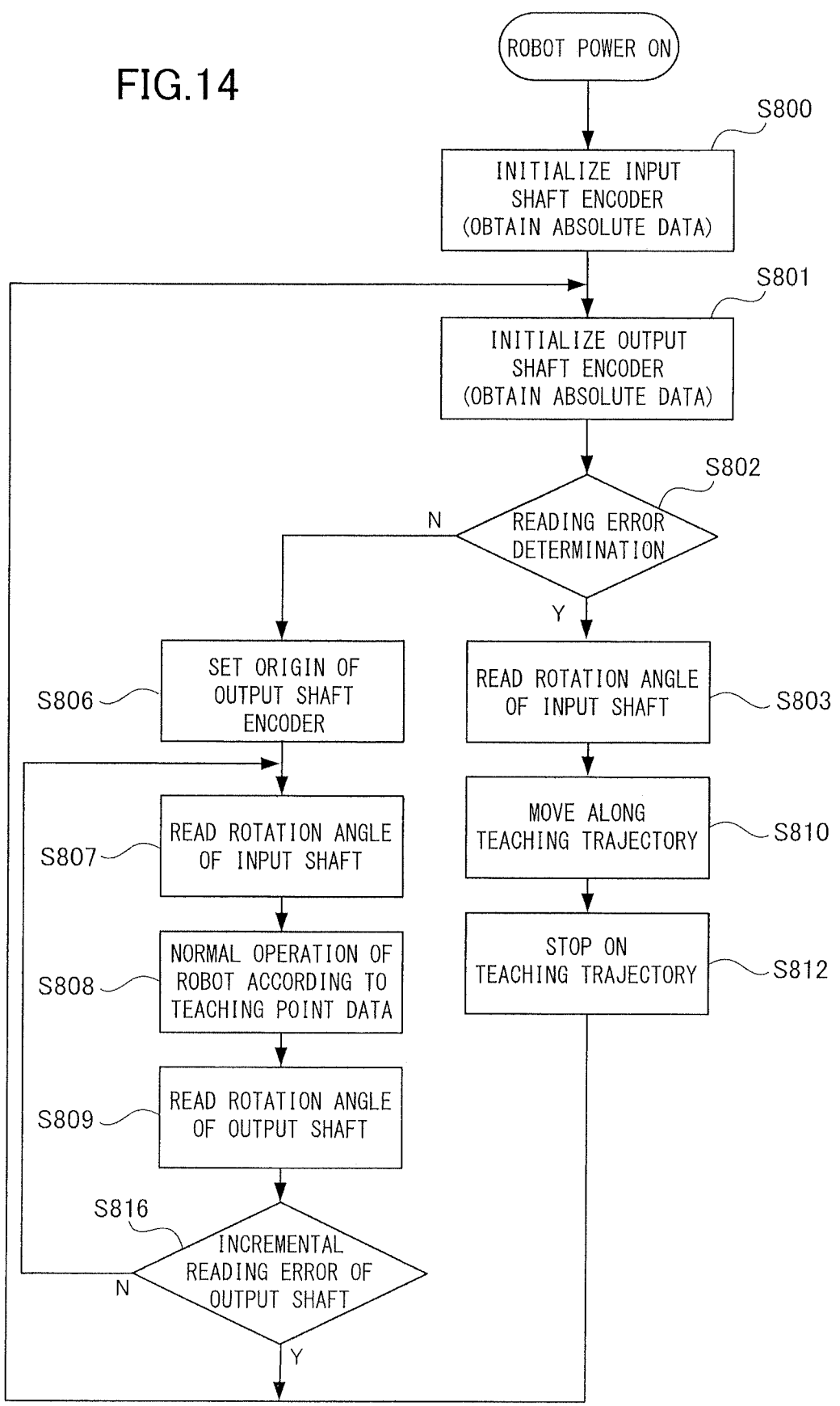
FIG. 14 is a flowchart illustrating a control procedure according to the third exemplary embodiment.
Figure 15:
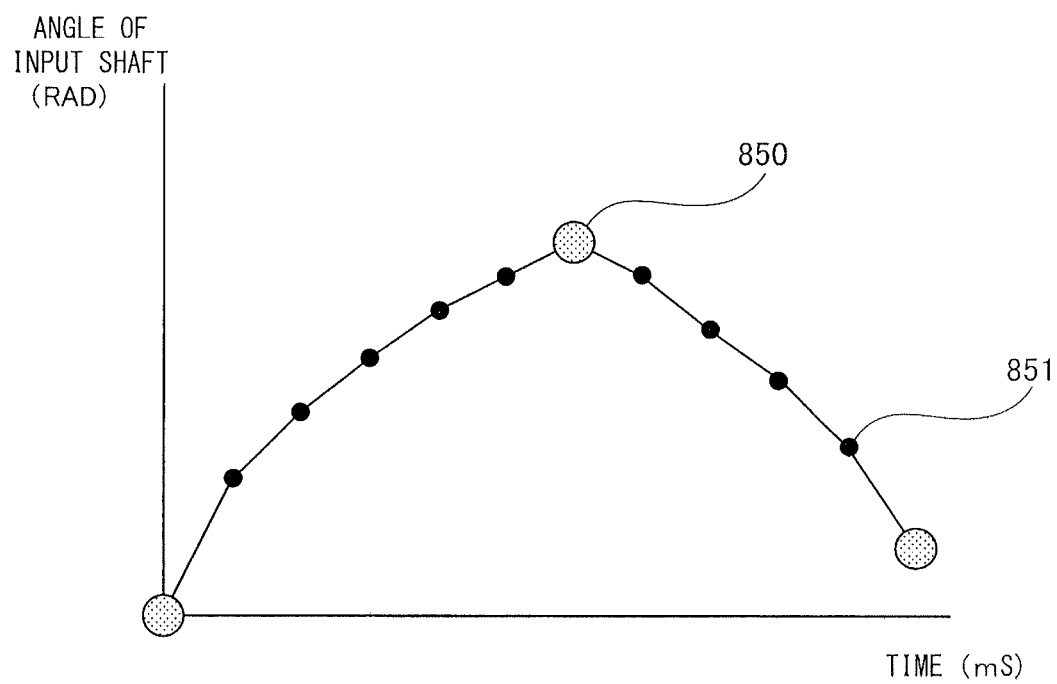
FIG. 15 is an explanatory diagram illustrating teaching points and a teaching trajectory according to the third exemplary embodiment.

FIG. 14 illustrates a flow of control of the third exemplary embodiment in a similar manner to FIGS. 9 and 12. In addition, FIG. 15 illustrates joint angles of the input shaft of the reduction gear 233 with a horizontal axis of time (mS) and a vertical axis of angle (radian). In FIG. 15, teaching points 850 stored in the teaching point storage portion 709 are indicated by relatively large dotted circles. In FIG. 15, positions of the joint, that is, joint angles corresponding to the three teaching points 850 are illustrated. In addition, intermediate trajectory points 851 serving as interpolated points on the trajectory generated by the teaching trajectory generation portion 708 by some kind of interpolation processing are indicated by small solid circles.

As illustrated in FIG. 15, in the case where the intermediate trajectory points 851 are generated between teaching points 850, the motor controller 702 performs servo control by the motor driving portion 701 aiming for the angles of the intermediate trajectory points 851, and thus causes the arm to operate along the trajectory. In typical robot control, input shaft angles serving as target values of the reduction gear 233 corresponding to the intermediate trajectory points 851 are often calculated such that the trajectory does not steeply change in, for example, time intervals of about 4 mS in consideration of the speed thereof.

The teaching trajectory storage portion 710 of FIG. 13 stores, for example, the teaching points 850 and the intermediate trajectory points 851 of FIG. 15. The absolute coordinate of the output shaft encoder 236 can be reobtained on the basis of the information of the teaching points 850 and the intermediate trajectory points 851 stored in the teaching trajectory storage portion 710.

FIG. 14 illustrates a control procedure in the case of reobtaining the absolute coordinate of the output shaft encoder 236 on the basis of the information of the teaching points 850 and the intermediate trajectory points 851 stored in the teaching trajectory storage portion 710 in the third exemplary embodiment.

FIG. 14 is a flowchart illustrated in a similar manner to FIG. 12 of the second exemplary embodiment, and difference of FIG. 14 from FIG. 12 is only steps S810 and S811.

In the case where an error is detected in the reading error determination of step S802, an encoder value is read from the input shaft encoder 235 in step S803 similarly to FIGS. 9 and 12. In step S810, the joint is driven such that the robot arm 201 moves on the robot trajectory. In this case, not just the next teaching point is selected as the target position serving as the destination of the movement as in the second exemplary embodiment but the teaching points 850 and the intermediate trajectory points 851 stored in the teaching trajectory storage portion 710 are sequentially selected.

That is, in the case where an error is detected in the reading error determination of step S802, a rotation angle is read from the input shaft encoder 235 in step S803, and the robot arm 201 is moved to one of the teaching points 850 and the intermediate trajectory points 851 stored in the teaching trajectory storage portion 710 by using the value thereof in step S810. The encoder output of the input shaft encoder 235 read in step S803 is used for determining a driving amount of the motor 231 for moving the standard portion of the robot arm 201 to one of the teaching points 850 and the intermediate trajectory points 851 stored in the teaching trajectory storage portion 710. When the motor 231 is driven by a predetermined driving amount, the standard portion of the robot arm 201 stops at the position of the one of the teaching points 850 and the intermediate trajectory points 851 in step S812. Then, the control transitions to step S801 similarly to the case of FIGS. 9 and 12. The other operations are similar to those described with reference to FIG. 12.

As described above, according to the third exemplary embodiment, redetection or reobtaining of the absolute position is possible even in the case where a foreign matter, dust, or scratch is present on the scale of the output shaft encoder 236 of the robot joint and an encoder error occurs. In this case, for example, in the third exemplary embodiment, the standard portion of the robot arm 201 is moved by, for example, setting a point on the trajectory generated from teaching points describing the robot operation for manufacturing an article as a target position. Specifically, the point is one of the teaching points 850 and the intermediate trajectory points 851. As described above, in redetection or reobtaining of the absolute position, the joint is operated by moving the robot arm 201 along the teaching trajectory, and the absolute position of the output shaft encoder 236 is reobtained at a teaching point. Therefore, the absolute coordinate of the output shaft encoder 236 can be reobtained without causing the problem of interference of the arm even in a state in which the robot arm 201 is installed in a factory and there are obstructs therearound. As a result, by obtaining highly-precise position information not affected by the twisting and backlash of the reduction gear 233 and operating the robot arm 201 on the basis of this, for example, highly-precise manufacture of an article is possible.

Fourth Exemplary Embodiment

In the first to third exemplary embodiments described above, in redetection or reobtaining of the absolute position in the case where an encoder reading error has occurred, re-reading from the output shaft encoder 236 is tried after moving and then stopping the robot arm 201. Particularly in the second and third exemplary embodiments, re-reading from the output shaft encoder 236 is tried after moving and then stopping the robot arm 201 at a teaching point or an intermediate trajectory point as a target position. Instead, redetection or reobtaining of the absolute position of the output shaft encoder 236 may be tried repetitively while moving the robot arm 201 along a planned robot trajectory (e.g., trajectory for manufacturing an article). By performing such control, for example, the robot does not have to be stopped for the redetection or reobtaining of the absolute position of the output shaft encoder 236 at, for example, a position different from an originally intended stopping position for manufacturing an article. As a result of this, the robot operation for manufacturing an article can be performed without delay, and thus an encoder error can be addressed while efficiently performing the planned operation for manufacturing an article or the like.

Here, in the third exemplary embodiment described above, the redetection or reobtaining of the absolute position of the output shaft encoder 236 is performed by stopping the robot arm 201 at a teaching point 850 or an intermediate trajectory point 851. For example, as illustrated in FIG. 15, in most cases, the intermediate trajectory points 851 are generated such that temporal intervals of moving the arm between the intermediate trajectory points 851 are constant, for example, at about 4 mS. In addition, as a matter of course, joint angles, that is, rotation angles of the intermediate trajectory points 851 obtained from the teaching points 850 are known or can be obtained by calculation or recalculation at the time when the trajectory is generated. That is, according to the trajectory generation by the teaching trajectory generation portion 708, the positions of the joint and time are known even in a state in which the robot arm 201 is moving, and the absolute position of the output shaft encoder 236 can be redetected or reobtained by utilizing this.

Figure 16:
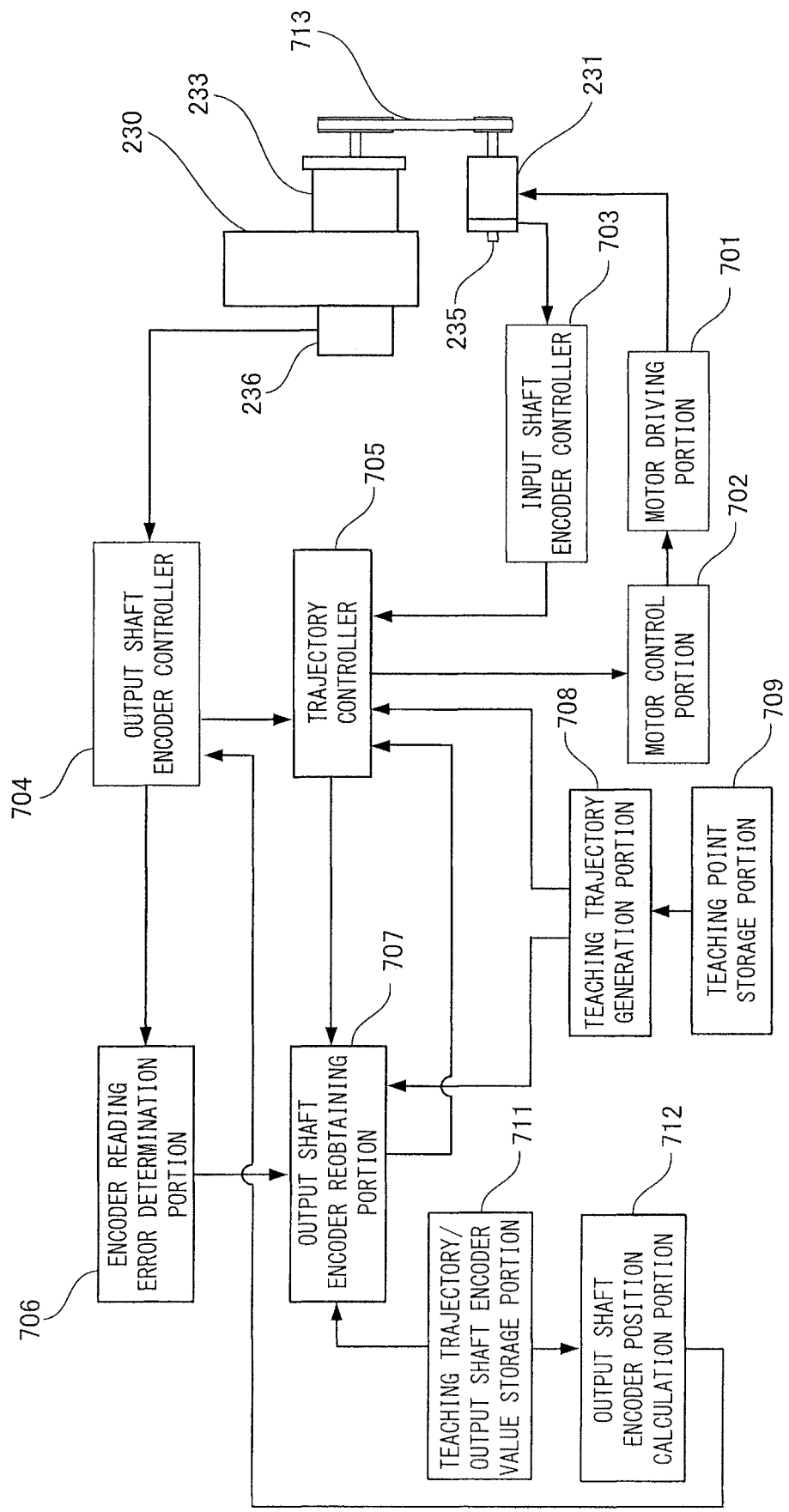
FIG. 16 is a block diagram illustrating a control system according to a fourth exemplary embodiment.

The control system of a fourth exemplary embodiment is configured as illustrated in FIG. 16. The form of illustration of FIG. 16 is similar to those of FIGS. 8, 11, 13, and so forth. Similarly to the case of FIGS. 2 and 3, elements different from FIGS. 8, 11, 13, and so forth that have been already described will be described for FIG. 16.

In the configuration of FIG. 16, the output of the teaching trajectory generation portion 708 is used by the trajectory controller 705 and the output shaft encoder reobtaining portion 707. The trajectory controller 705 operates the robot arm 201 along the teaching trajectory. In addition, the output shaft encoder reobtaining portion 707 obtains the absolute position information of the output shaft encoder 236 and time information of the intermediate trajectory points 851 from the teaching trajectory generation portion 708 at the same time, and outputs the obtained information to a teaching trajectory/output shaft encoder value storage portion 711.

An output shaft encoder position calculation portion 712 calculates a rotation speed of the joint from the intermediate trajectory point 851 by using the data stored in the teaching trajectory/output shaft encoder value storage portion 711. That is, the rotation speed is calculated from rotation angle information of the input shaft of the reduction gear 233 at two intermediate trajectory points 851 and time between the two intermediate trajectory points 851, which is 4 mS for example. As a result of this, the rotation speed of the joint at each intermediate trajectory point 851 can be calculated. By using the time after obtaining the origin of the output shaft encoder 236 until the output shaft encoder reobtaining portion 707 stops reobtaining the absolute value data, how much the output shaft encoder 236 has rotated can be known. Therefore, by adding this time to origin information obtained from the output shaft encoder 236 and transmitting this value to the output shaft encoder controller 704 as origin information, the origin of the output shaft encoder 236 can be set in a similar manner to the case of stopping the robot arm 201 and setting the origin.

Figure 17:
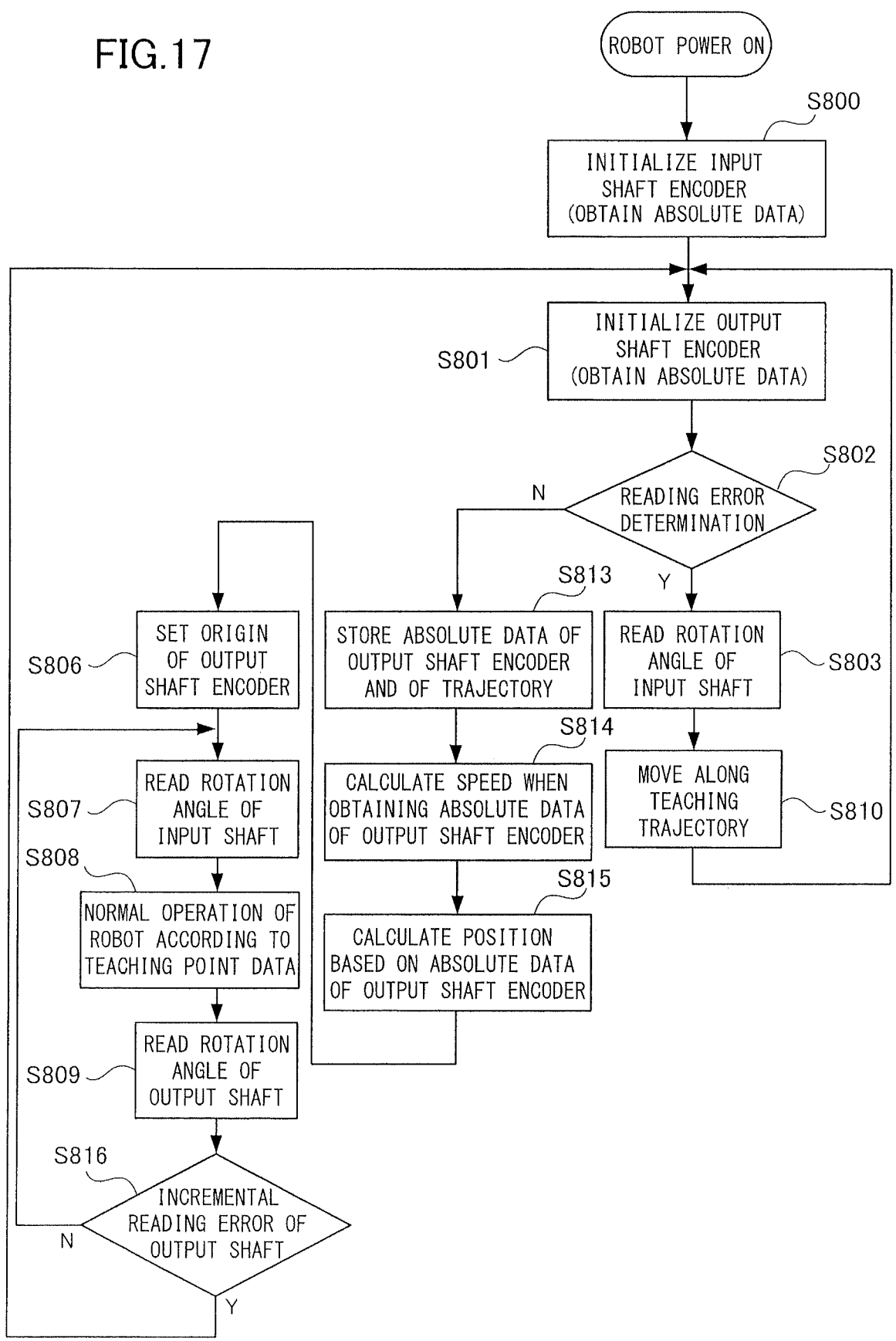
FIG. 17 is a flowchart illustrating a control procedure according to the fourth exemplary embodiment.

Next, a control procedure of the present exemplary embodiment will be described with reference to FIG. 17. FIG. 17 is a flowchart corresponding to FIGS. 9, 12, 14, and so forth. Also in FIG. 17, the same processing steps as in FIGS. 9, 12, 14, and so forth are denoted by the same step numbers.

Also in the control procedure of FIG. 17, the processing of steps S800, S801, and S802 is the same as in FIGS. 9, 12, 14, and so forth. In addition, the reading from the input shaft encoder 235 of step S803 in the case where an encoder error is detected in step S802 is also similar, and the robot arm 201 is caused to operate on the teaching trajectory by using the output of the input shaft encoder 235 in subsequent step S810. However, in this step S810, for example, movement to the next teaching point 850 or intermediate trajectory point 851 is instructed, and the control returns to step S801.

Difference of FIG. 17 from FIGS. 9, 12, 14, and so forth is that steps S813, S814, and S815 are inserted before steps S806, S807, S808, S809, and S816 performed in the case where an encoder error is not detected in step S802.

That is, in the case where a reading error of the output shaft encoder 236 is not detected in step S802, the control transitions to step S813. In step S813, the teaching trajectory/output shaft encoder value storage portion 711 stores the absolute data of the output shaft encoder 236 and trajectory data, for example, the intermediate trajectory points 851.

Next, in step S814, the output shaft encoder position calculation portion 712 calculates a rotation speed between intermediate trajectory points 851 by using a time from the previous intermediate trajectory point 851, which is 4 mS for example, on the basis of two kinds of data stored in the teaching trajectory/output shaft encoder value storage portion 711.

Next, in step S815, an origin position is obtained by adding an angle difference calculated from the rotation speed calculated by the output shaft encoder position calculation portion 712 in step S814 to the absolute data obtained in step S801. In step S806, the origin of the output shaft encoder 236 is set by using this origin position.

In steps S807, S808, S809, and S816, the robot arm 201 is caused to normally operate similarly to FIGS. 9, 12, and 14 of the first to third exemplary embodiments on the basis of the setting of the origin of the output shaft encoder 236 in step S806.

As described above, also according to the fourth exemplary embodiment, redetection or reobtaining of the absolute position is possible even in the case where a foreign matter, dust, or scratch is present on the scale of the output shaft encoder 236 and an encoder error occurs. In this case, in the fourth exemplary embodiment, the arm can be continuously operated along the planned robot trajectory toward the next teaching point or intermediate trajectory point even in the case where an encoder error has occurred. Then, in the case where a reading error is no longer detected in steps S801 and S802, the origin position is calculated on the basis of the angular speed of the joint in steps S813 to S815. Further, the output shaft encoder 236 can be continuously operated in a normal absolute operation by using this origin position. That is, according to the present exemplary embodiment, the absolute position of the output shaft encoder 236 can be reobtained while continuously moving the robot arm 201 along the teaching trajectory. Therefore, the originally intended robot operation for manufacturing an article or the like can be progressed without delay while reobtaining the absolute position even in the case where an encoder error occurs in the output shaft encoder 236. Therefore, a manufacturing operation of an article can be performed greatly efficiently. In this case, highly-precise robot arm control can be performed on the basis of the absolute coordinate of the output shaft encoder, and thus a high-quality article can be efficiently manufactured without occurrence of interference with obstructs in the surroundings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or BLU-RAY DISC (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-232096, filed on Dec. 1, 2017, which is hereby incorporated by reference herein in its entirety.

What is claimed is:

1. A robot apparatus comprising:
   a robot arm comprising a joint and links connected via the joint;
   a first encoder configured to detect information related to a position of the joint; and
   a second encoder configured to detect information related to the position of the joint independently from the first encoder, the second encoder including (i) a scale in which a pattern is formed, and (ii) a detector configured to relatively move with respect to the scale in a case where the joint moves, the detector being configured to detect position information of the joint by reading the pattern of the scale; and
   a controller configured to control an operation of the joint of the robot arm on a basis of detection results of the first encoder and the second encoder,
   wherein, in a case where the detector of the second encoder outputs an error signal, other than position information, or the detector of the second encoder outputs position information that is of an undefined value, the controller is configured to execute processing that (i) causes the joint to move, and (ii) after the joint moves, attempts to detect position information of the joint by the second encoder.

2. The robot apparatus according to claim 1, further comprising a transmission configured to transmit a driving force from a drive source to the joint,
   wherein the first encoder is an input shaft encoder configured to detect rotation of an input shaft of the transmission, and the second encoder is an output shaft encoder configured to detect rotation of an output shaft of the transmission.

3. The robot apparatus according to claim 1, wherein at least one of the first encoder and the second encoder has a function of an absolute encoder and a function of an incremental encoder.

4. The robot apparatus according to claim 1, wherein the second encoder has a function of an absolute encoder and a function of an incremental encoder, and wherein, in a case where a detection result of the absolute encoder of the second encoder includes an error signal, other than the position information, or position information that is of an undefined value, the controller executes the processing such that the controller causes the joint to move by using detection results of the first encoder and the incremental encoder of the second encoder.

5. The robot apparatus according to claim 4, wherein, after the position information of the joint is successfully detected by the second encoder in the processing, the controller obtains the position information of a current position of the joint by adding or subtracting an output value, which is detected after the processing has finished, of the incremental encoder of the second encoder to or from a value representing the position information detected by the absolute encoder of the second encoder in the processing.

6. The robot apparatus according to claim 5, wherein the controller sets the position information detected by the absolute encoder of the second encoder in the processing as an initial value of position information detected by the second encoder after the processing.

7. The robot apparatus according to claim 1, wherein the scale comprises a first track in which pattern elements, in which information for specifying an absolute position of the joint is embedded, are periodically arranged, and a second track in which pattern elements are arranged in a shorter period than in the first track, and wherein a plurality of the pattern elements of the second track are included in each reading range that the detector can read at once.

8. The robot apparatus according to claim 7, wherein, in a case where the error signal or the position information that is of the undefined value is output from the detector of the second encoder, the controller repetitively executes the processing until the detector reads the pattern from the scale without outputting an error signal, other than position information, or position information of an undefined value, wherein, each time the joint moves in the processing, the controller causes the joint to move by a predetermined amount on the basis of the detection result of the first encoder, and wherein the predetermined amount is equal to or greater than an amount corresponding to one period of the first track.

9. The robot apparatus according to claim 1, wherein, in the processing, the controller causes the joint to move by using the detection result of the first encoder and teaching point information for controlling a position of the robot arm aiming for a position of the joint corresponding to a specific teaching point included in the teaching point information.

10. The robot apparatus according to claim 1, wherein, in the processing, the controller causes the joint to move by using the detection result of the first encoder and teaching point information for controlling a position of the robot arm, and the controller causes moving of the joint to stop in a state where the robot arm is on a robot trajectory connecting teaching points that are included in the teaching point information.

11. The robot apparatus according to claim 1, in the processing, the controller causes the joint to move by using the detection result of the first encoder and teaching point information for controlling a position of the robot arm, and wherein, in attempting to detect the position information of the joint, the controller attempts to detect the position information while the robot arm is moving along a robot trajectory connecting teaching points that are included in the teaching point information.

12. A manufacturing system comprising:
a plurality of manufacturing machines, one of which is the robot apparatus according to claim 1; and
a control system including a processor and a memory, the control system being configured to cause the plurality of manufacturing machines to cooperate to manufacture an article.

13. A method for manufacturing an article, the method comprising:
a step of preparing a manufacturing system that includes the robot apparatus according to claim 1; and
a step of manufacturing the article by operating the manufacturing system.

14. The robot apparatus according to claim 1, wherein the controller causes the joint to move based on the detection result of the first encoder when executing the processing.

15. The robot apparatus according to claim 14, wherein, when the error signal or the position information that is of an undefined value is output from the detector of the second encoder, the controller repetitively executes the processing until the detector of the second encoder reads the pattern from the scale without outputting an error signal, other than position information, or position information that is of an undefined value.

16. The robot apparatus according to claim 14, wherein the second encoder has a function of an absolute encoder, and wherein a driving amount in causing the joint to move in the processing is set to an amount equal to or greater than a resolution of the absolute encoder.

17. The robot apparatus according to claim 1, wherein, the controller is configured to detect the position information by the second encoder after the processing.

18. A control method for controlling a robot apparatus with a joint connecting links of a robot arm and first and second encoders each configured to detect position information of the joint, the control method comprising:

determining, using error determination processing, that an error signal, other than position information, is output from the second encoder or position information that is of an undefined value is output from the second encoder;

moving the joint of the robot arm after the second encoder has output the error signal or the position information that is of an undefined value; and detecting the position information of the joint by the second encoder after the joint has moved.

19. A non-transitory computer-readable recording medium storing a program for executing the control method according to claim 18.

20. The method according to claim 18, wherein in detecting the position information of the joint by the second encoder, the position information of the joint is obtained at a position where the position information is detected by the second encoder.

* * * * *